(12) United States Patent
Alexander et al.

(10) Patent No.: US 12,365,306 B1
(45) Date of Patent: Jul. 22, 2025

(54) EXTENDABLE ARM ASSEMBLY

(71) Applicant: GM Global Technology Operations LLC, Detroit, MI (US)

(72) Inventors: Paul W. Alexander, Ypsilanti, MI (US); Wonhee Michael Kim, Troy, MI (US); Tiantian Li, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/978,274

(22) Filed: Dec. 12, 2024

(51) Int. Cl.
*B60R 22/18* (2006.01)

(52) U.S. Cl.
CPC ...... *B60R 22/18* (2013.01); *B60R 2022/1818* (2013.01)

(58) Field of Classification Search
CPC ............ B60R 22/18; B60R 2022/1818; B60R 21/207
See application file for complete search history.

(56) References Cited

U.S. PATENT DOCUMENTS

| | | | | |
|---|---|---|---|---|
| 6,129,419 A * | 10/2000 | Neale | ......... | B60N 2/58 297/284.6 |
| 9,783,155 B2 * | 10/2017 | Kondo | ......... | B60R 22/26 |
| 10,632,952 B2 * | 4/2020 | Markusic | ......... | B60R 21/231 |
| 11,400,879 B2 * | 8/2022 | Kang | ......... | B60N 2/42727 |
| 11,634,098 B1 * | 4/2023 | Line | ......... | B60N 2/77 280/730.2 |
| 11,975,670 B1 * | 5/2024 | Faruque | ......... | B60R 21/207 |

FOREIGN PATENT DOCUMENTS

| | | | | |
|---|---|---|---|---|
| CN | 107839551 A | * | 3/2018 | ......... B60N 2/0224 |
| CN | 112739581 A | * | 4/2021 | ......... B60N 2/42 |
| DE | 4120608 A1 | * | 1/1993 | ......... B60N 2/4214 |
| DE | 102018124649 A1 | * | 4/2019 | ......... B60N 2/64 |
| DE | 102019116567 A1 | * | 12/2019 | ......... B60N 2/753 |
| KR | 20240001499 A | * | 6/2022 | ......... B60R 21/207 |

* cited by examiner

*Primary Examiner* — Faye M Fleming
(74) *Attorney, Agent, or Firm* — CANTOR COLBURN LLP

(57) ABSTRACT

An extendable arm assembly includes an extendable arm structure defining a first axis, a second axis perpendicular to the first axis, and a third axis perpendicular to the first axis and the second axis. The extendable arm structure is configured to be actuated between a stowed configuration, an extended configuration in which the extendable arm structure extends along the first axis, and an intermediate configuration between the stowed configuration and the extended configuration. The extendable arm structure includes a plurality of expandable cells defining cell chambers therein. The extendable arm assembly is configured to inflate the cell chambers to actuate the extendable arm structure from the stowed configuration to the intermediate configuration.

20 Claims, 36 Drawing Sheets

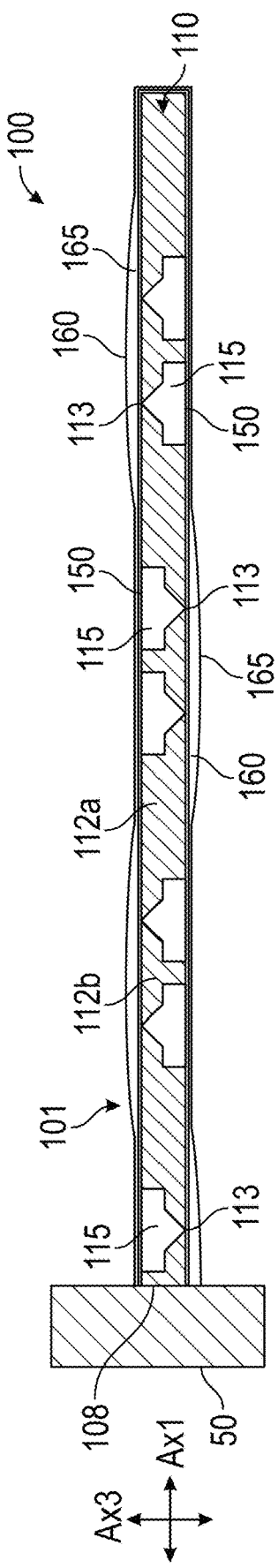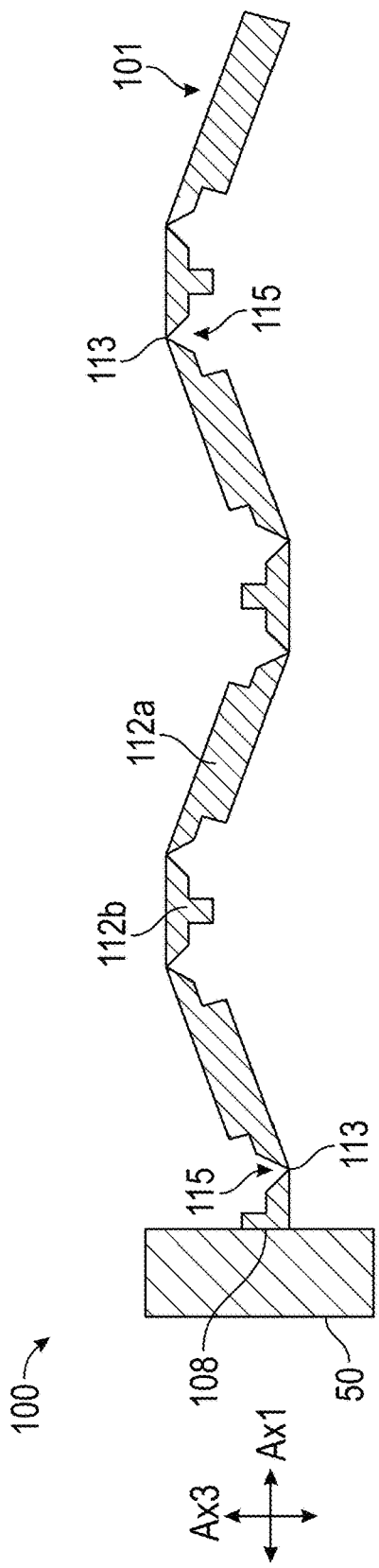
FIG. 6A
FIG. 6B

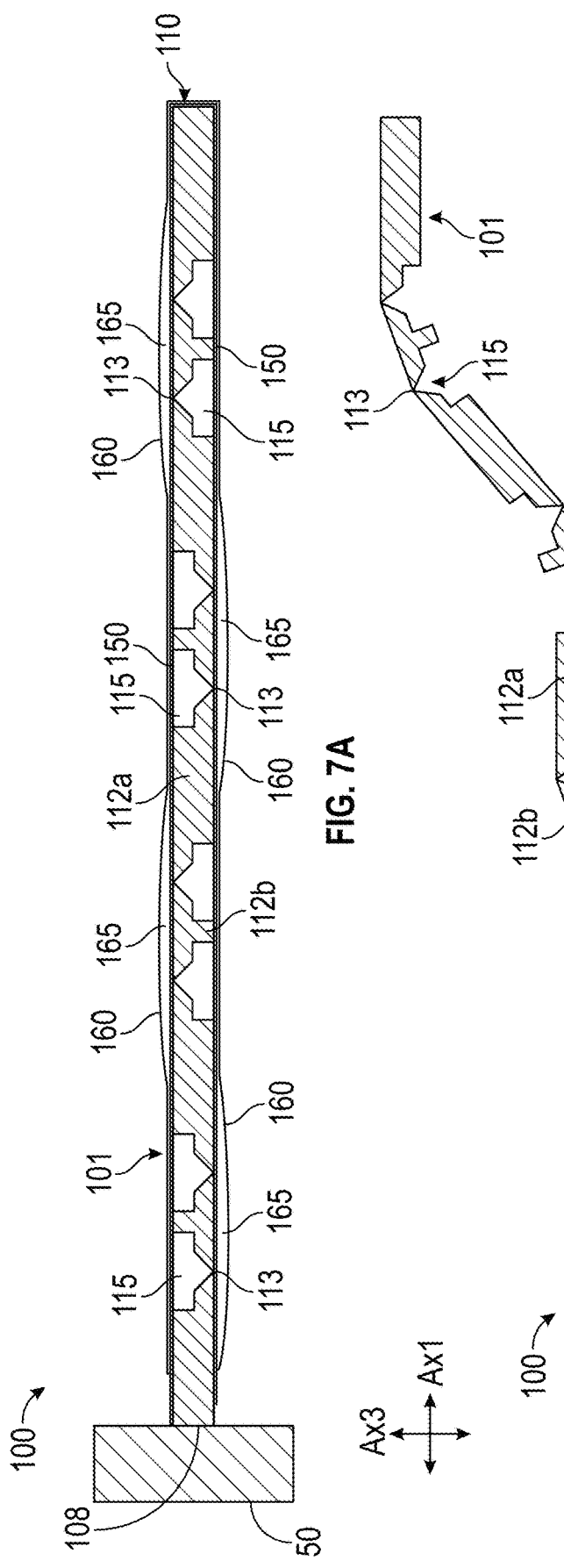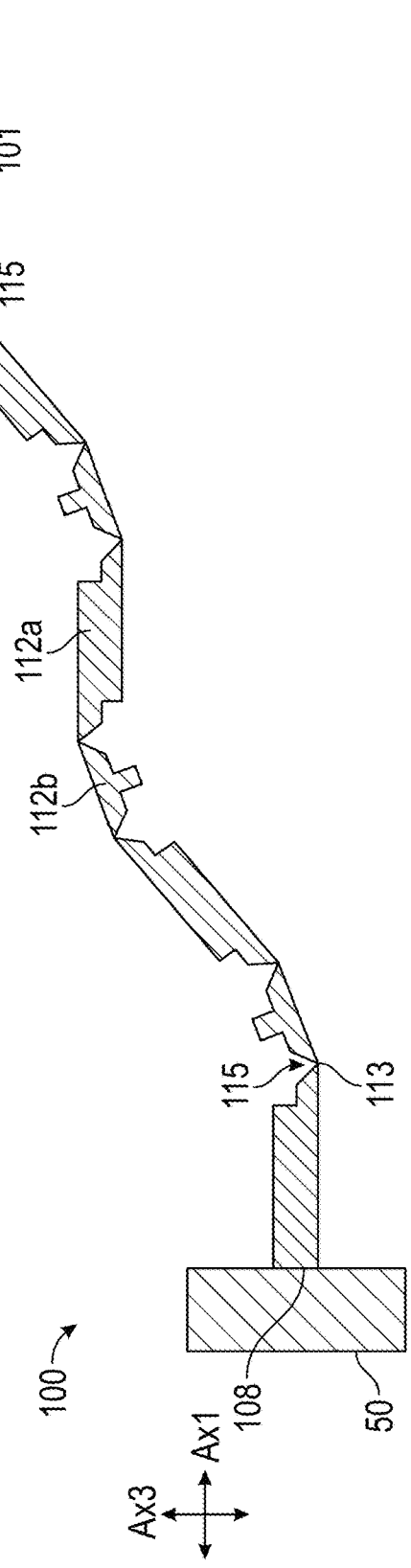

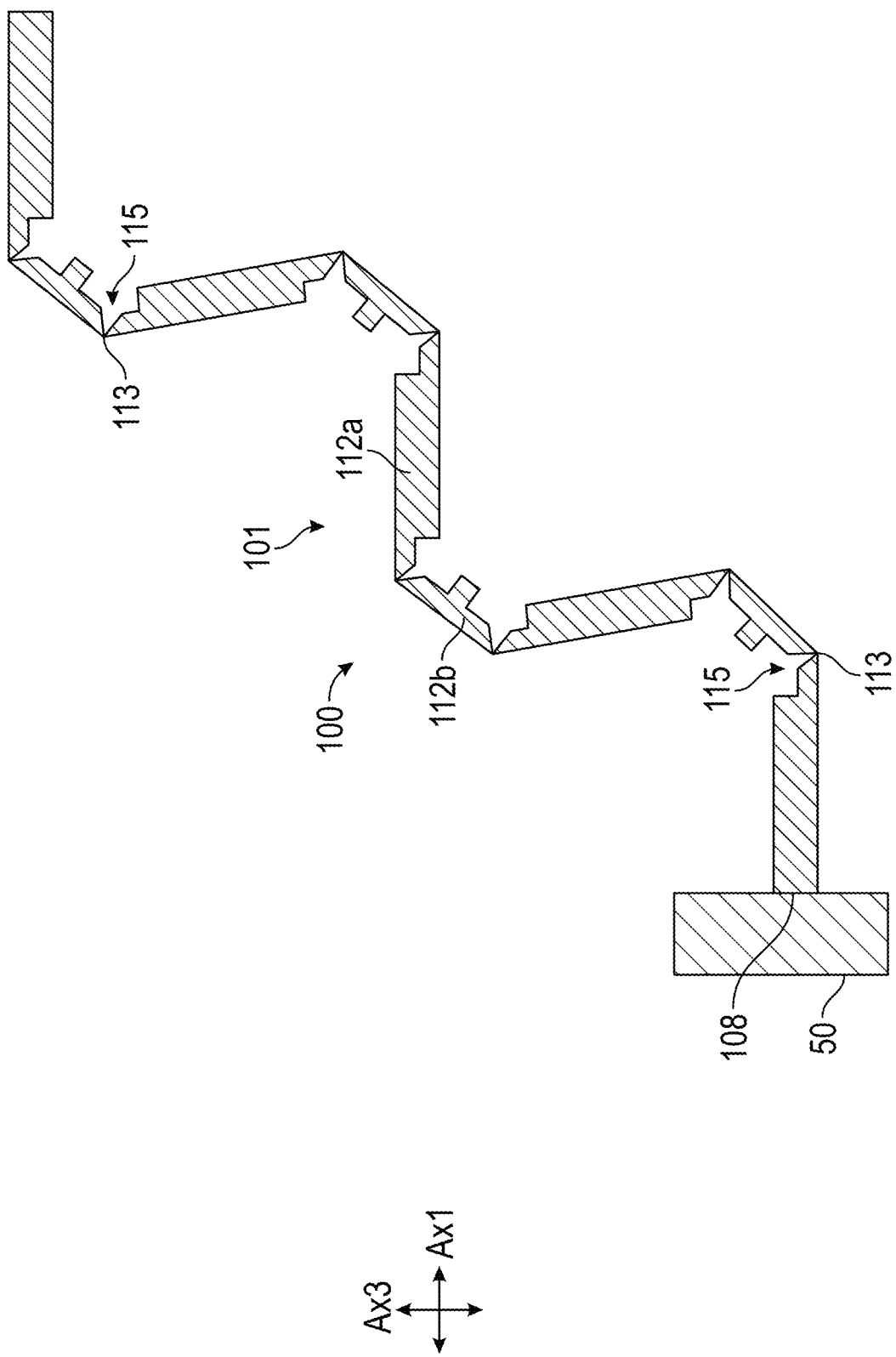

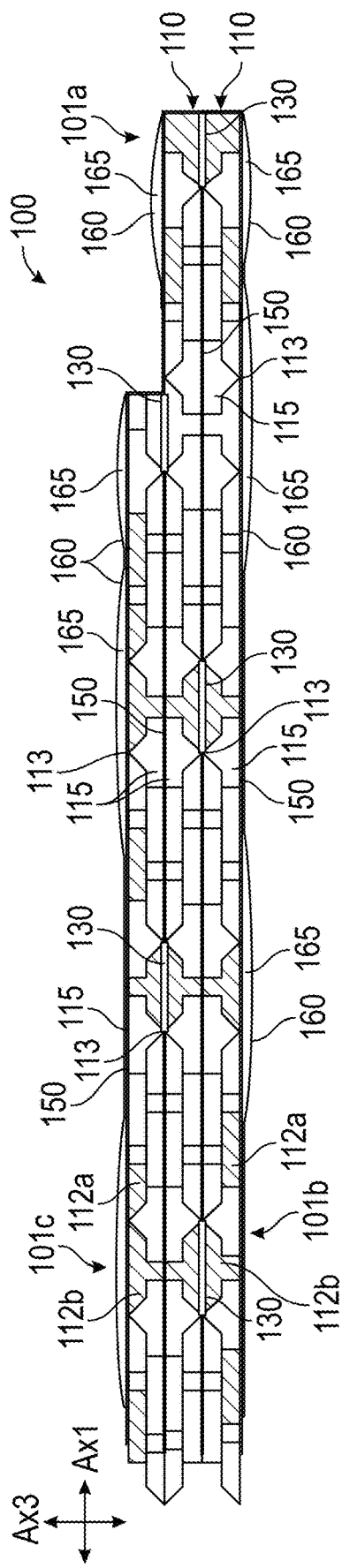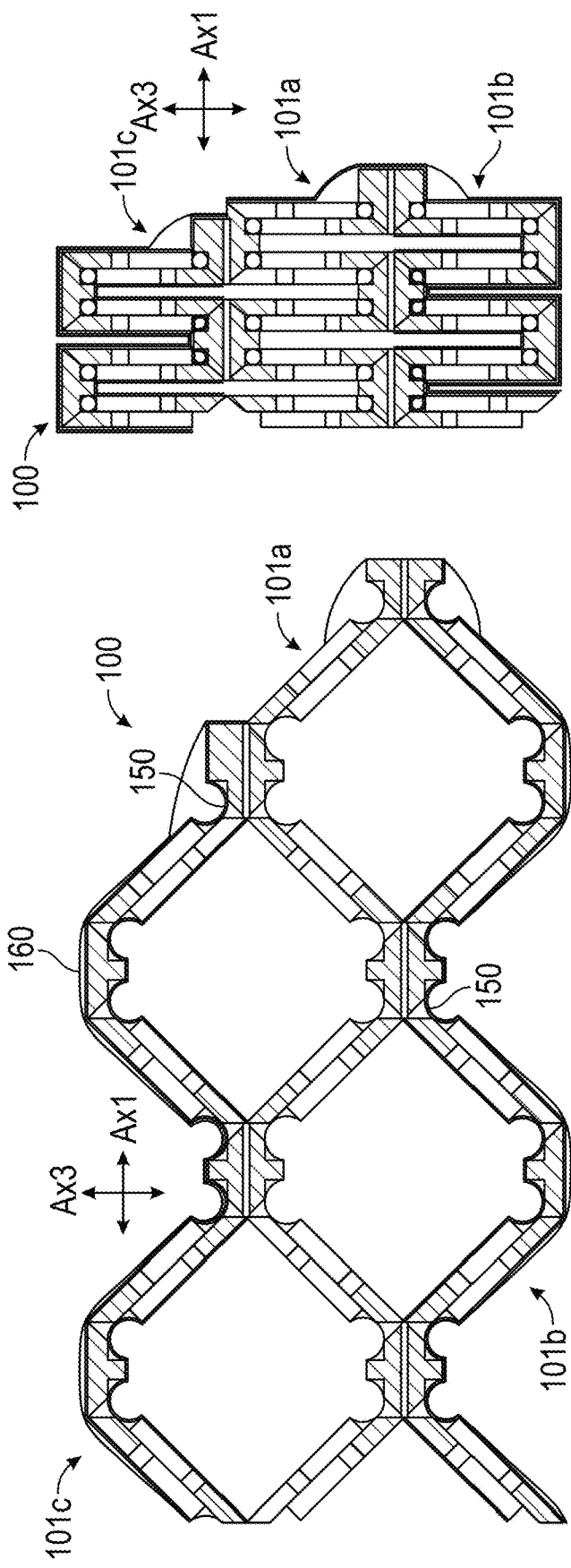
FIG. 9A
FIG. 9B
FIG. 9C

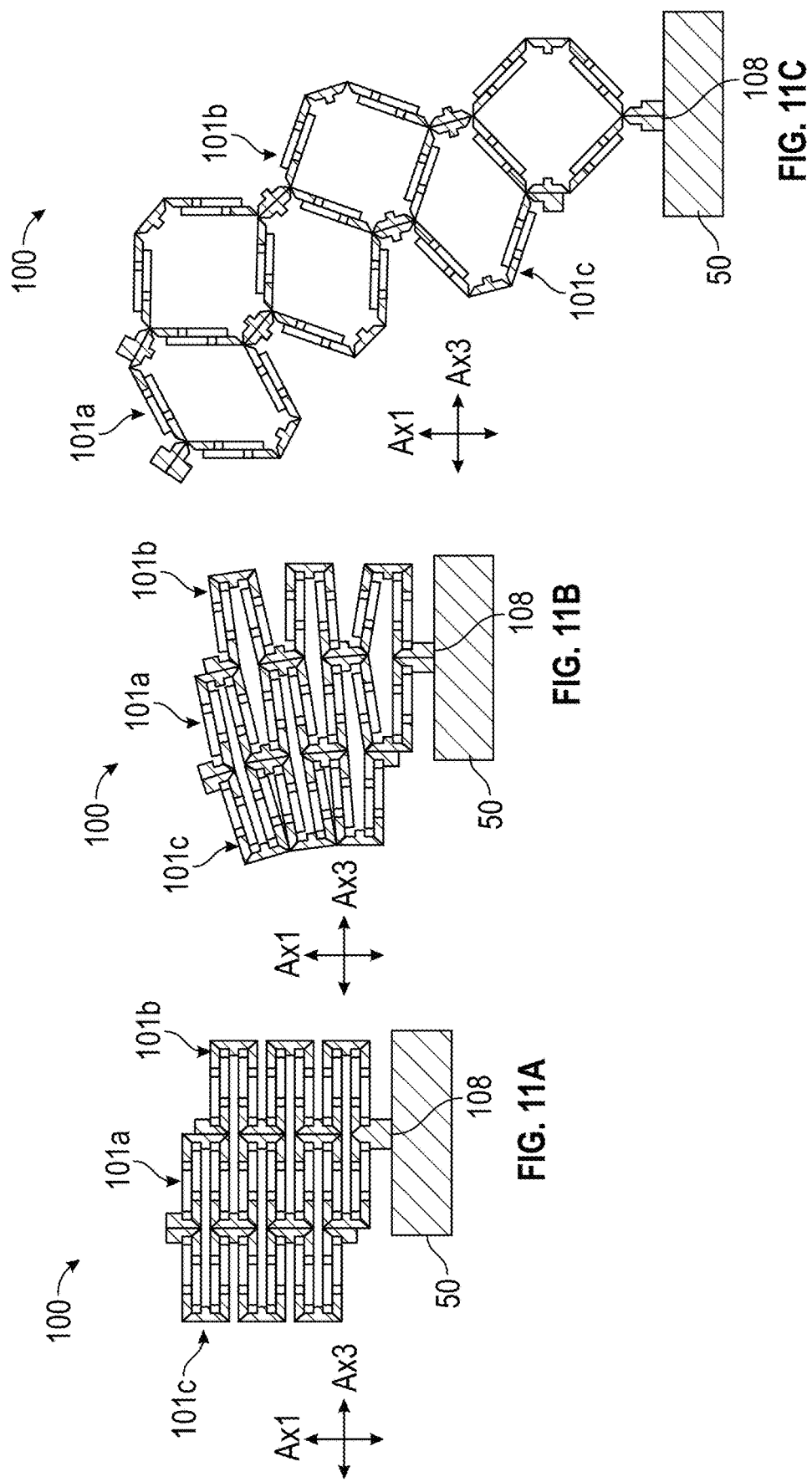

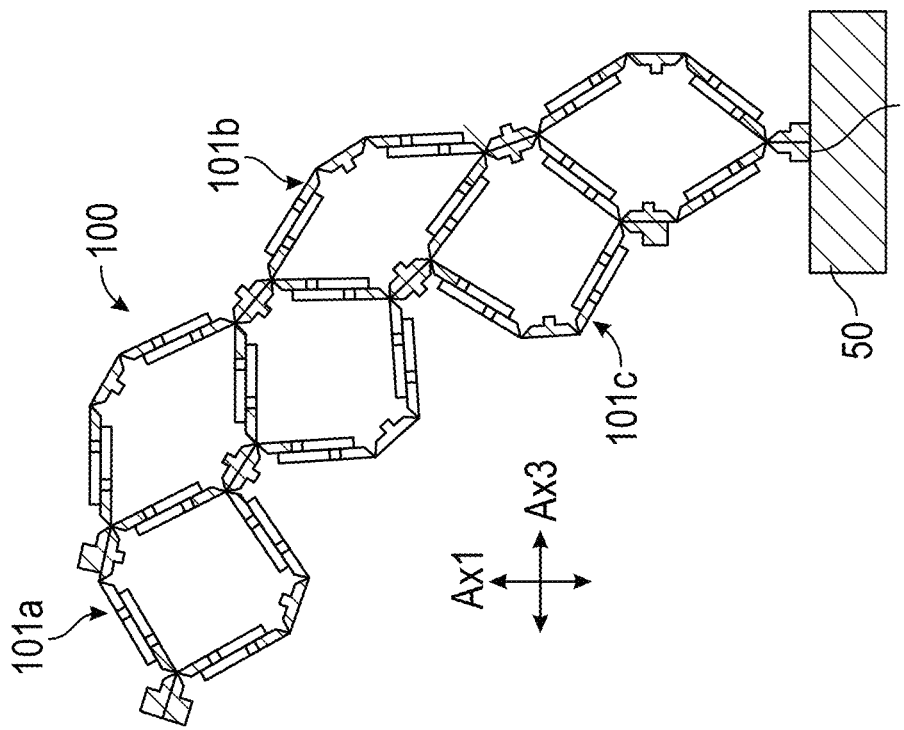
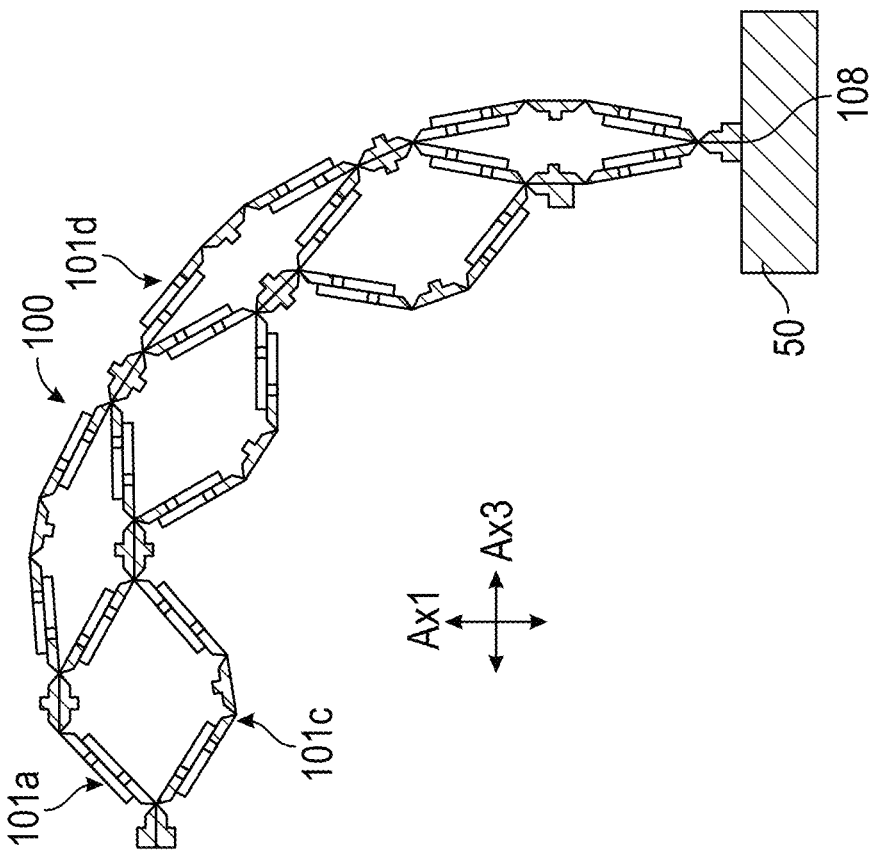

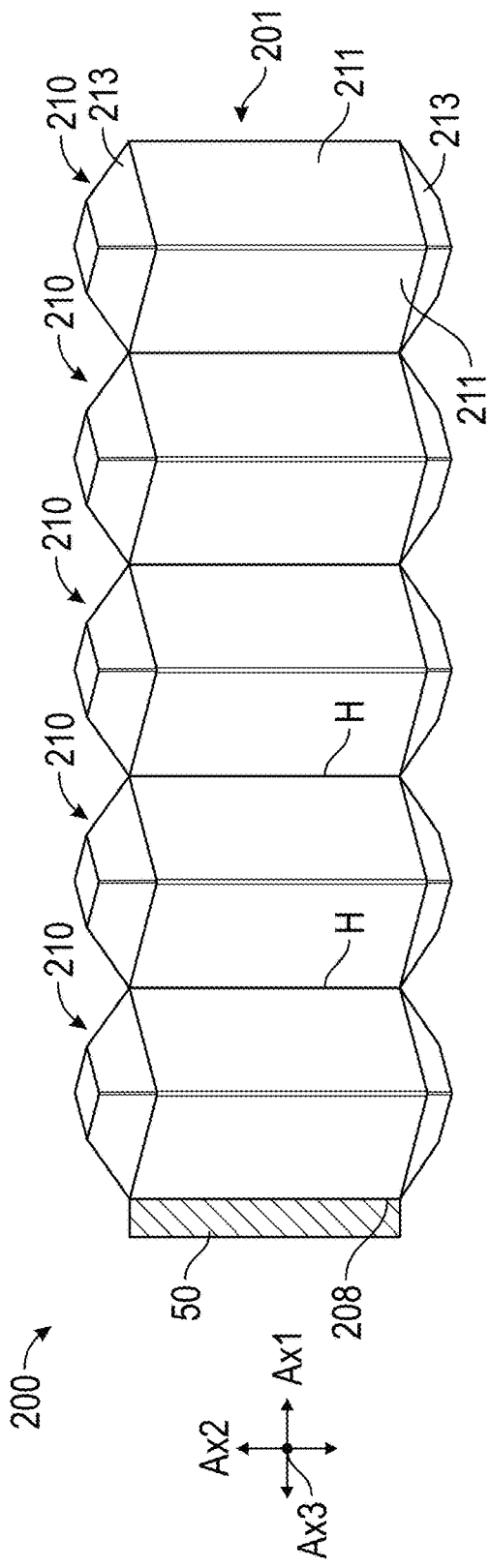
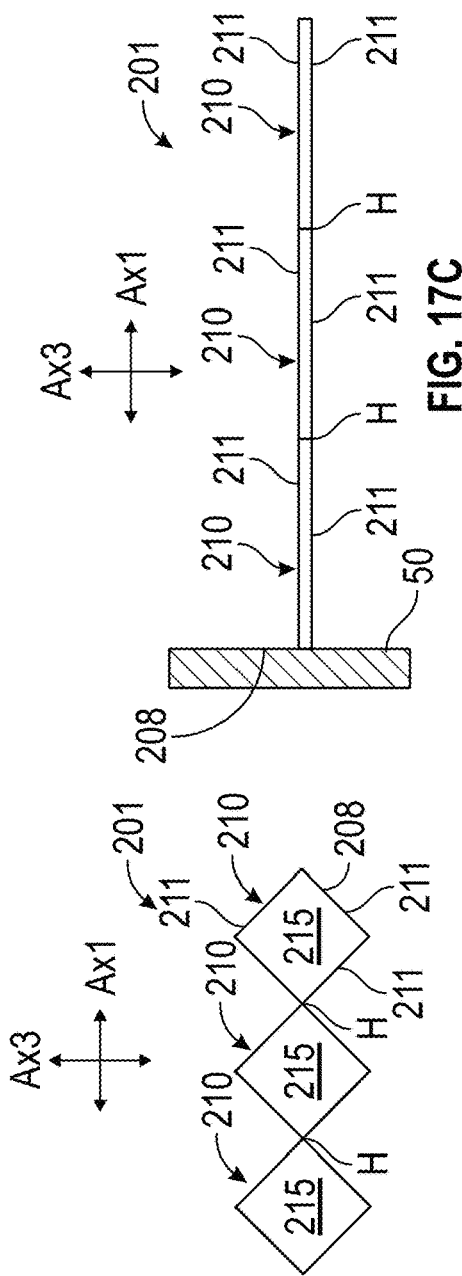
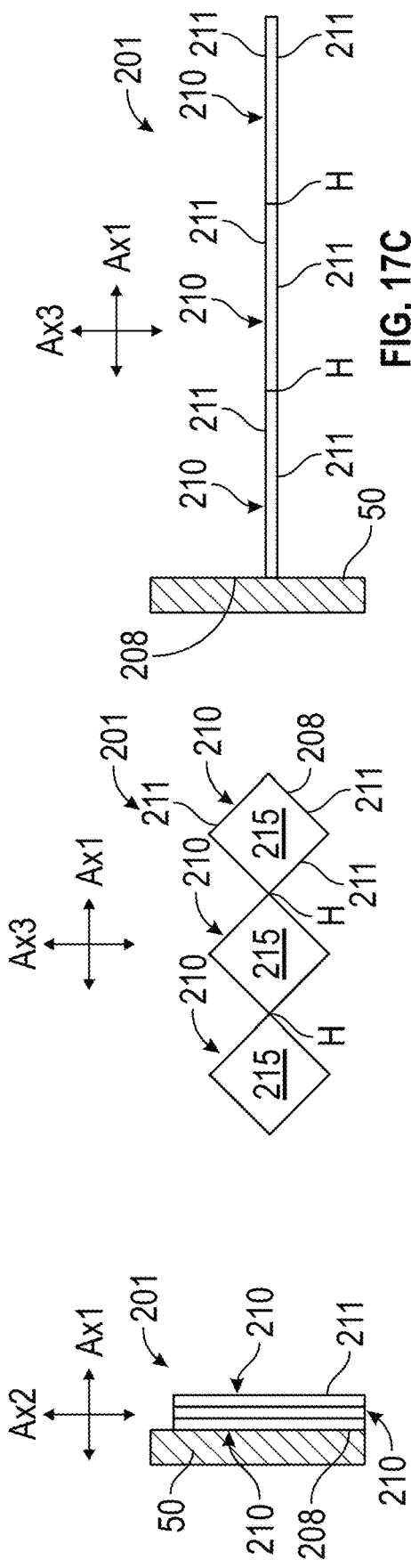

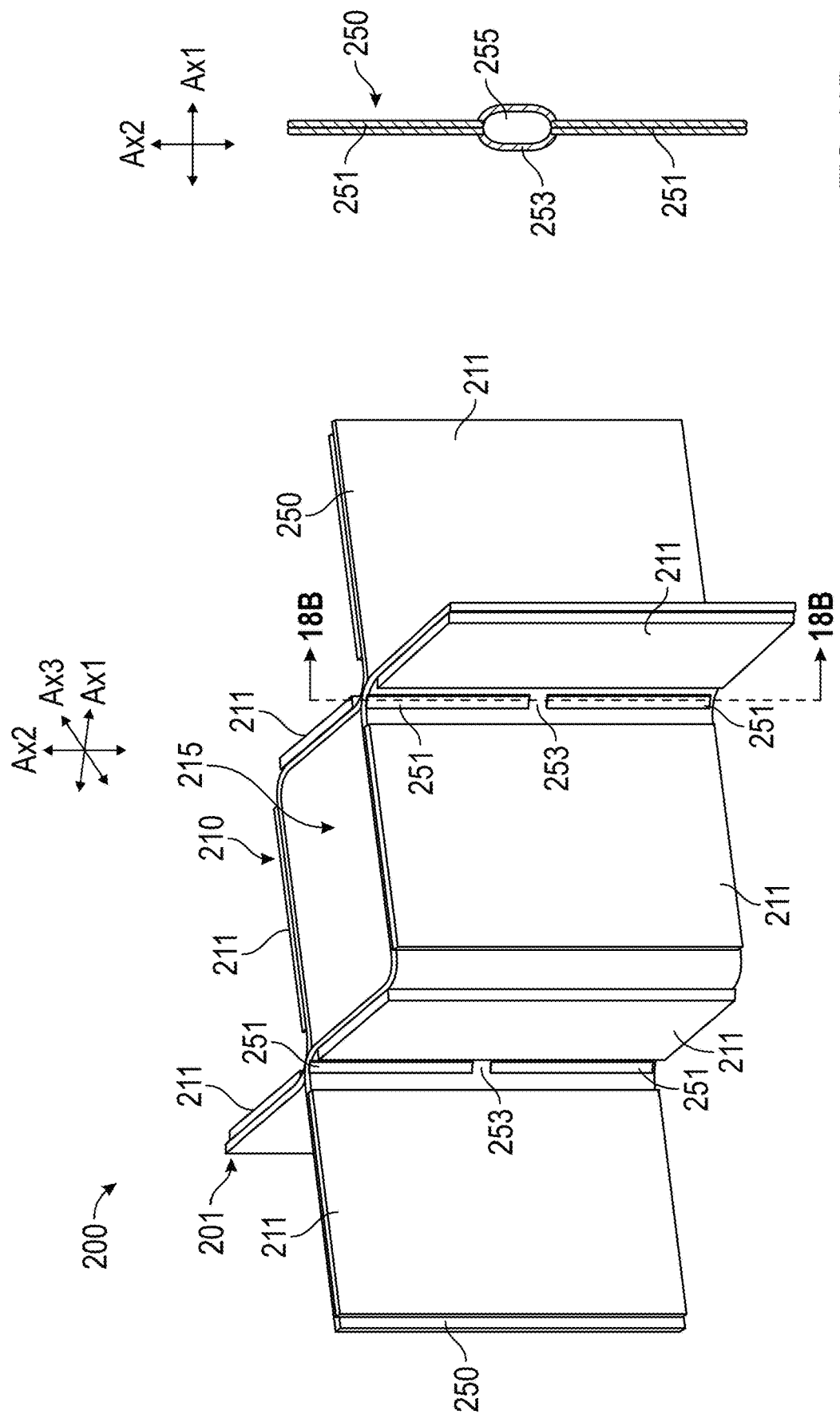

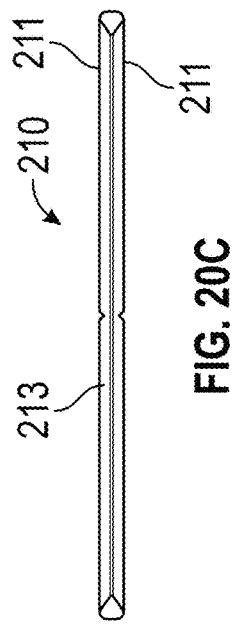
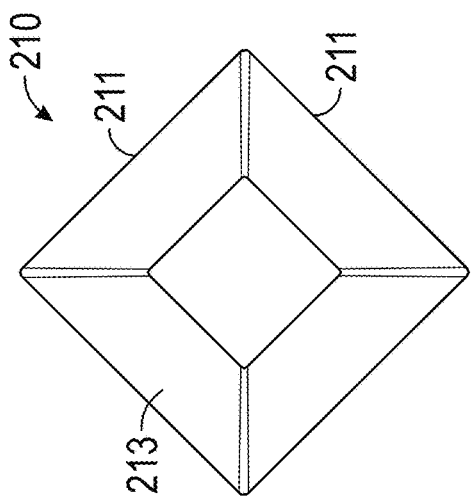
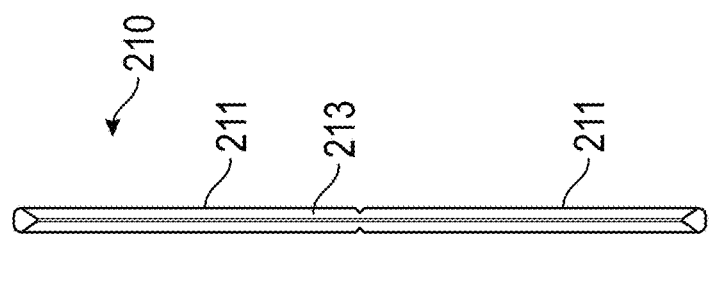
FIG. 20C
FIG. 20B
FIG. 20A

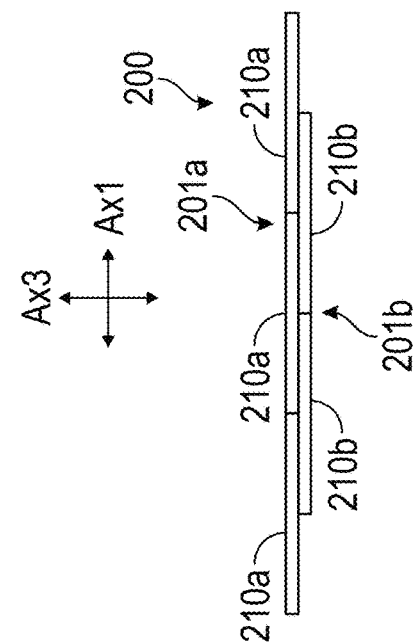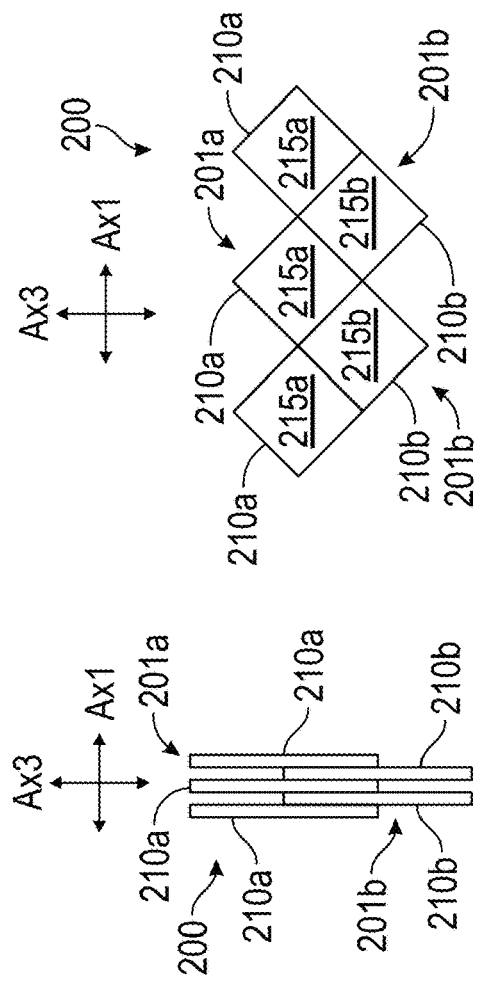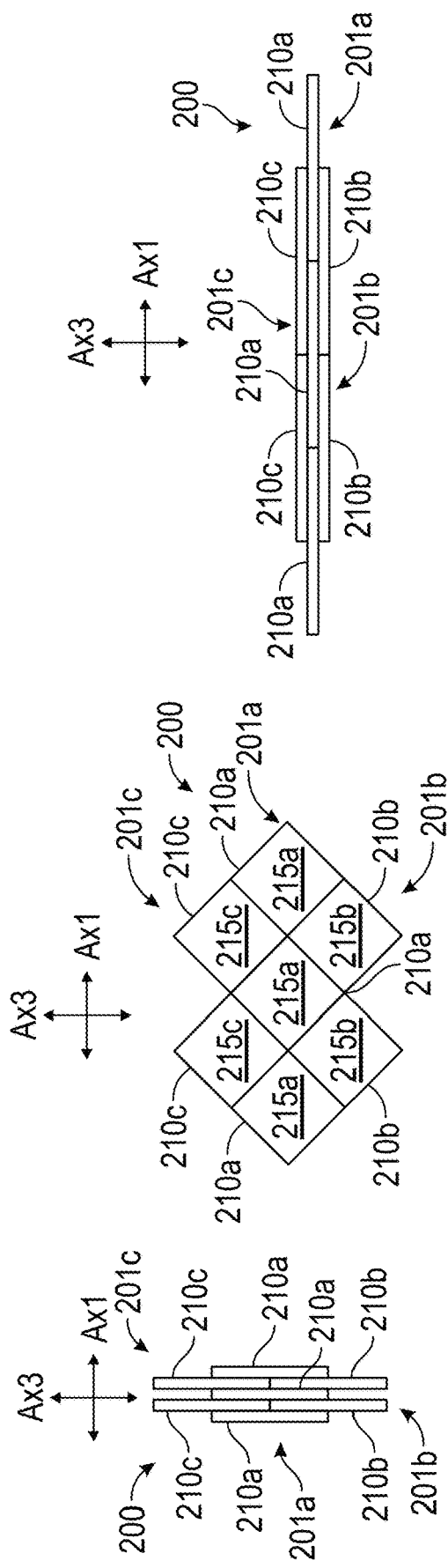

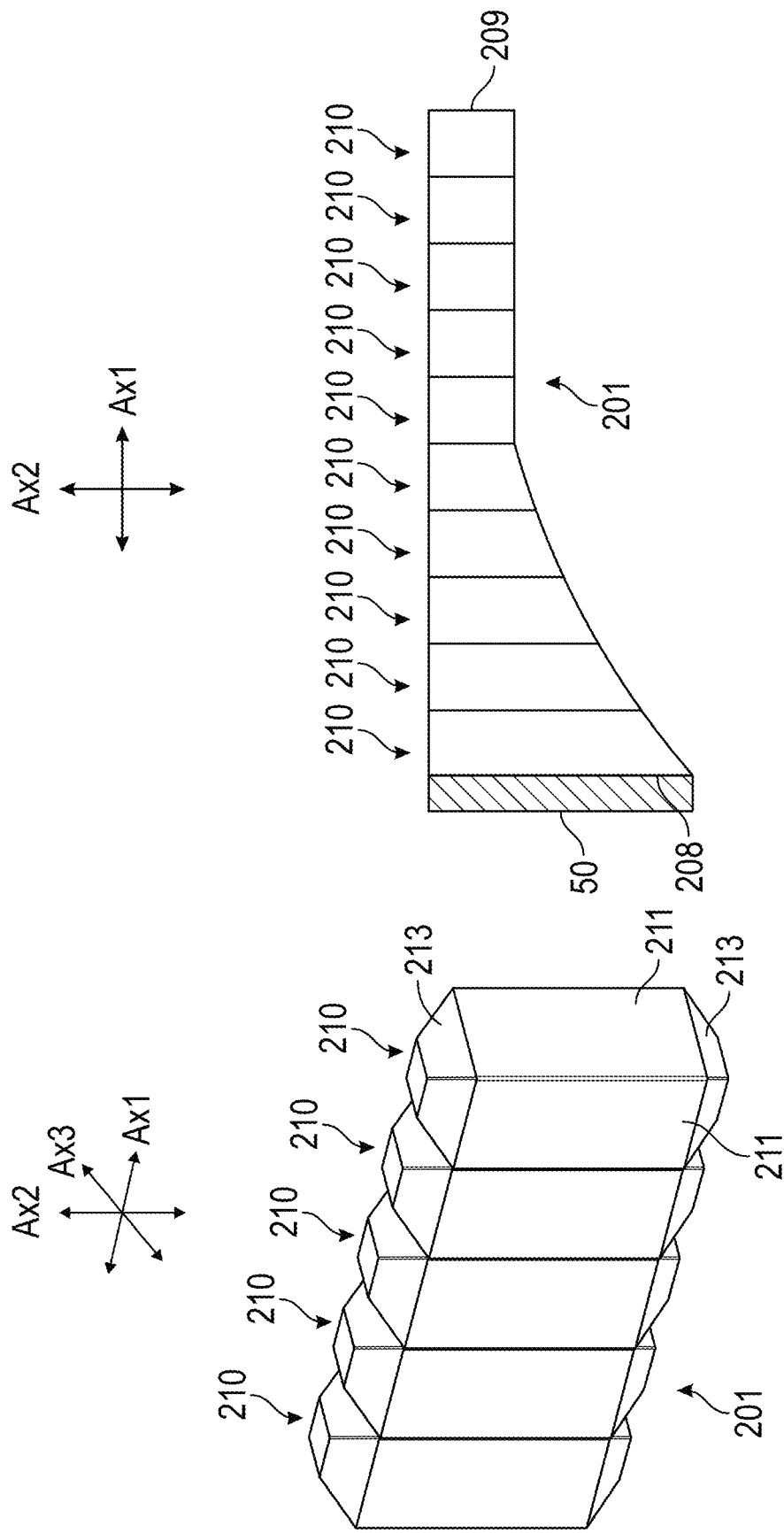

EXTENDABLE ARM ASSEMBLY

The subject disclosure relates to an extendable arm assembly.

Extendable arm assemblies have various uses. For example, a vehicle may include an extendable arm assembly in the form of a seat belt presenter with one end of a seatbelt thereon that extends and retracts from a B-pillar. Improvements to extendable arm assemblies is desirable.

SUMMARY

In one exemplary embodiment an extendable arm assembly comprises an extendable arm structure defining a first axis, a second axis perpendicular to the first axis, and a third axis perpendicular to the first axis and the second axis, the first extendable arm structure configured to be actuated between a stowed configuration, an extended configuration in which the extendable arm structure extends along the first axis, and an intermediate configuration between the stowed configuration and the extended configuration. The extendable arm structure comprises a plurality of expandable cells defining cell chambers therein. The extendable arm assembly is configured to inflate the cell chambers to actuate the extendable arm structure from the stowed configuration to the intermediate configuration In addition to one or more of the features described herein, the extendable arm assembly is configured to inflate the cell chambers to return the extendable arm structure from the extended configuration to the intermediate configuration.

In addition to one or more of the features described herein, the extendable arm assembly is configured to apply vacuum to the cell chambers to return the extendable arm structure from the intermediate configuration to the stowed configuration.

In addition to one or more of the features described herein, the plurality of expandable cells comprise a first bladder delimiting the cell chambers.

In addition to one or more of the features described herein, each of the plurality of expandable cells comprises a plurality of side panels disposed on the first bladder.

In addition to one or more of the features described herein, each of the expandable cells comprises end caps positioned at end portions of the side panels along the second axis.

In addition to one or more of the features described herein, the end caps are configured to be folded in the stowed configuration and the extended configuration.

In addition to one or more of the features described herein, the extendable arm assembly comprises a plurality of second bladders defining bladder chambers therein, at least one of the second bladders being disposed on each of the plurality of expandable cells.

In addition to one or more of the features described herein, the extendable arm assembly is configured to inflate the bladder chambers to actuate the extendable arm structure from the intermediate configuration to the extended configuration.

In addition to one or more of the features described herein, one or more inner flowpaths extends between the plurality of cell chambers to fluidly connect the cell chambers.

In addition to one or more of the features described herein, the extendable arm assembly comprises magnets disposed on the plurality of expandable cells, the magnets being configured to generate magnetic forces therebetween to return the extendable arm assembly from the intermediate configuration to the stowed configuration.

In addition to one or more of the features described herein, at least one of the plurality of expandable cells includes a fluid inlet.

In addition to one or more of the features described herein, the extendable arm assembly comprises a pneumatic transfer device fluidly coupled to the cell chambers and configured to apply vacuum to and inflate the cell chambers.

In addition to one or more of the features described herein, the extendable arm assembly comprises a pneumatic transfer device fluidly coupled to the bladder chambers and configured to inflate the bladder chambers.

In addition to one or more of the features described herein, the extendable arm assembly comprises a flexure hinge connecting at least two of the side panels.

In addition to one or more of the features described herein, each of the side panels is diamond shaped, and portions of the side panels extend into the end caps.

In addition to one or more of the features described herein the extendable arm structure is a first extendable arm structure, the extendable arm assembly further comprises a second extendable arm structure attached to the first extendable arm structure, the second extendable arm structure comprises a plurality of expandable cells defining cell chambers therein, and the extendable arm assembly is configured to inflate the cell chambers of the second extendable arm structure to actuate the second extendable arm structure from the stowed configuration to the intermediate configuration.

In addition to one or more of the features described herein, the extendable arm assembly further comprises a third extendable arm structure. The second extendable arm structure and the third extendable arm structure are attached to opposite sides of the first extendable arm structure along the third axis. The third extendable arm structure comprises a plurality of expandable cells defining cell chambers therein. The extendable arm assembly is configured to inflate the cell chambers of the third extendable arm structure to actuate the second extendable arm structure from the stowed configuration to the intermediate configuration.

In another exemplary embodiment, an extendable arm assembly comprises an extendable arm structure, a first pneumatic transfer device, and a second pneumatic transfer device. The extendable arm structure defines a first axis, a second axis perpendicular to the first axis, and a third axis perpendicular to the first axis and the second axis. The extendable arm structure is configured to be actuated between a stowed configuration, an extended configuration in which the extendable arm structure extends along the first axis, and an intermediate configuration between the stowed configuration and the extended configuration. The extendable arm structure comprises a plurality of expandable cells defining cell chambers therein, the expandable cells comprising a first bladder delimiting the cell chambers, and a plurality of second bladders defining bladder chambers therein, at least one of the plurality second bladders being disposed on each of the plurality of expandable cells. The first pneumatic transfer device is fluidly coupled to the plurality cell chambers and configured to apply vacuum to and inflate the cell chambers. The second pneumatic transfer device fluidly coupled to the bladder chambers and configured to apply vacuum to and inflate the bladder chambers. One or more inner flowpaths extends between the cell chambers to fluidly connect the cell chambers. At least one of the plurality expandable cells comprises a fluid inlet fluidly coupled to the first pneumatic transfer device. The first pneumatic transfer device is configured to inflate the cell chambers to actuate the extendable arm structure from the stowed configuration to the intermediate configuration. The second pneumatic transfer device is configured to inflate the bladder chambers to actuate the extendable arm structure from the intermediate configuration to the extended configuration. The first pneumatic transfer device is configured to inflate the cell chambers to return the extendable arm structure from the extended configuration to the intermediate configuration. The first pneumatic transfer device is configured to apply vacuum to the cell chambers to return the extendable arm structure from the intermediate configuration to the stowed configuration. Each of the expandable cells comprises a plurality of side panels disposed on the first bladder, end caps disposed on end portions of the side panels along the second axis and configured to be folded in the stowed configuration and the extended configuration In yet another exemplary embodiment, a vehicle comprises a seat, an occupant securing device configured to secure an occupant of the vehicle, and an extendable arm structure on which at least one end of the occupant securing device is attached. The extendable arm structure defines a first axis, a second axis perpendicular to the first axis, and a third axis perpendicular to the first axis and the second axis. The extendable arm structure configured to be actuated between a stowed configuration, an extended configuration in which the extendable arm structure extends along the first axis, and an intermediate configuration between the stowed configuration and the extended configuration. The extendable arm structure comprising a plurality of expandable cells defining cell chambers therein. The extendable arm assembly is configured to inflate the cell chambers to actuate the extendable arm structure from the stowed configuration to the intermediate configuration.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 6A is an explanatory view of an extendable arm assembly in an extended configuration according to a non-limiting example;

FIG. 6B is an explanatory view of the extendable arm assembly of FIG. 6A in an intermediate configuration;

FIG. 7A is an explanatory view of an extendable arm assembly in an extended configuration according to a non-limiting example;

FIG. 7B is an explanatory view of the extendable arm assembly of FIG. 7A in an intermediate configuration;

FIG. 7C is an explanatory view of the extendable arm assembly of FIG. 7A in an intermediate configuration;

FIG. 9A is an explanatory view of an extendable arm assembly in an extended configuration according to a non-limiting example;

FIG. 9B is an explanatory view of an extendable arm assembly in an intermediate configuration according to a non-limiting example;

FIG. 9C is an explanatory view of an extendable arm assembly in a stowed configuration according to a non-limiting example;

FIG. 11A is an explanatory view of an extendable arm assembly in a stowed configuration according to a non-limiting example;

FIG. 11B is an explanatory view of an extendable arm assembly in an intermediate configuration according to a non-limiting example;

FIG. 11C is an explanatory view of an extendable arm assembly in an intermediate configuration according to a non-limiting example;

FIG. 11D is an explanatory view of an extendable arm assembly in an intermediate configuration according to a non-limiting example;

FIG. 11E is an explanatory view of an extendable arm assembly in an intermediate configuration according to a non-limiting example;

FIG. 16 is a perspective view of an extendable arm assembly according to a non-limiting example;

FIG. 17A is an explanatory view of an extendable arm assembly in a stowed configuration according to a non-limiting example;

FIG. 17B is an explanatory view of an extendable arm assembly in an intermediate configuration according to a non-limiting example;

FIG. 17C is an explanatory view of an extendable arm assembly in an extended configuration according to a non-limiting example;

FIG. 18A is a perspective view of a portion of an extendable arm assembly according to a non-limiting example;

FIG. 18B is a cross-sectional view taken at 18B-18B in FIG. 18A;

FIG. 20A is a view along a second axis of an expandable cell of an extendable arm assembly in a stowed configuration according to a non-limiting example;

FIG. 20B is view along a second axis of the expandable cell of an extendable arm assembly in an intermediate configuration according to a non-limiting example;

FIG. 20C is view along a second axis of the expandable cell of an extendable arm assembly in an extended configuration according to a non-limiting example;

FIG. 22A is an explanatory view of an extendable arm assembly in a stowed configuration according to a non-limiting example;

FIG. 22B is an explanatory view of an extendable arm assembly in an intermediate configuration according to a non-limiting example;

FIG. 22C is an explanatory view of an extendable arm assembly in an extended configuration according to a non-limiting example;

FIG. 23A is an explanatory view of an extendable arm assembly in a stowed configuration according to a non-limiting example;

FIG. 23B is an explanatory view of an extendable arm assembly in an intermediate configuration according to a non-limiting example;

FIG. 23C is an explanatory view of an extendable arm assembly in an extended configuration according to a non-limiting example;

FIG. 26 is a perspective view of an extendable arm assembly according to a non-limiting example;

FIG. 27 is a view along a third axis of an extendable arm assembly according to a non-limiting example;

DETAILED DESCRIPTION

Figure 1:
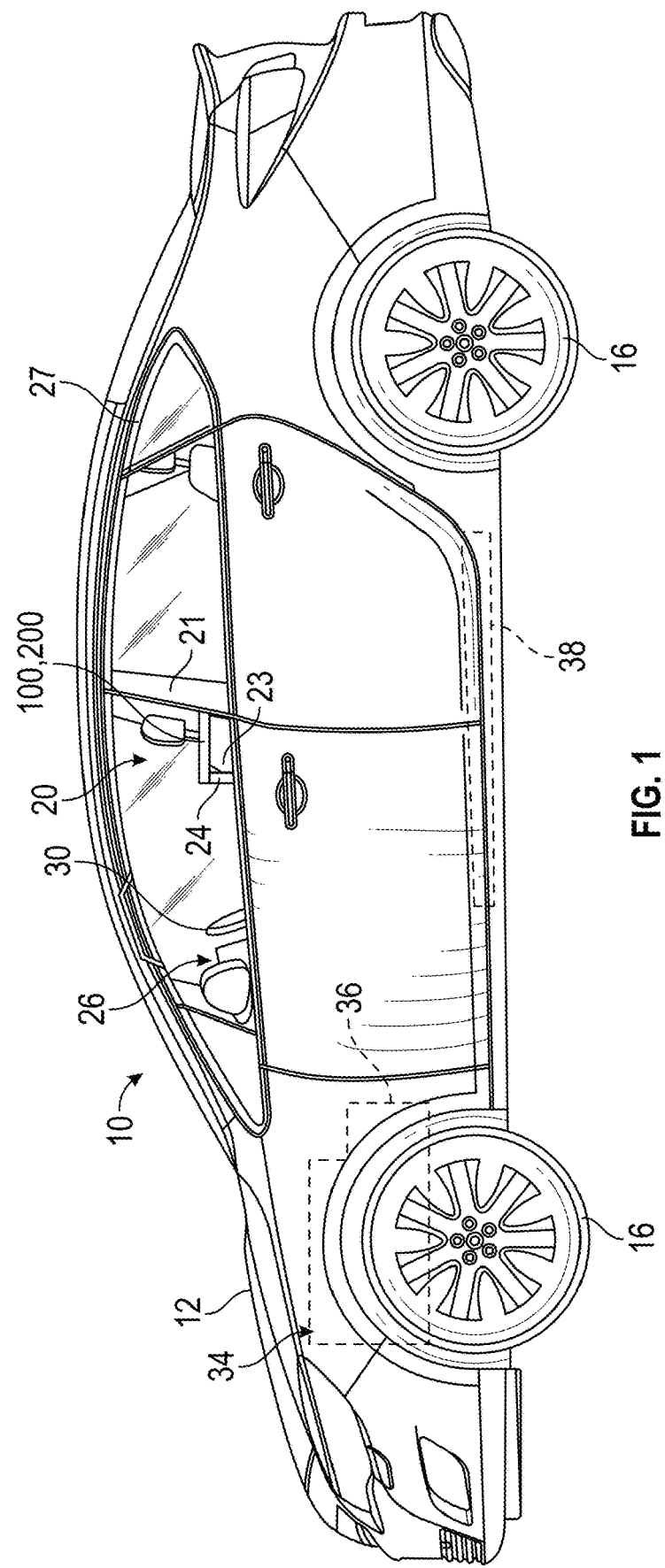
FIG. 1 is a left side view of a vehicle including an extendable arm assembly according to a non-limiting example.

The following description is merely exemplary in nature and is not intended to limit the present disclosure, its application or uses.

It should be understood that throughout the drawings, corresponding reference numerals indicate like or corresponding parts and features. As used herein, the term controller refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle 10 according to a non-limiting example is shown in FIG. 1. The vehicle 10 includes a body 12 supported on a plurality of wheels 16. One or more of the plurality of wheels 16 are steerable. The body 12 defines, in part, a passenger compartment 20 having vehicle seats 23 positioned behind a dashboard 26. A steering control 30 is arranged between the vehicle seats 23 and the dashboard 26. The steering control 30 is operated to control orientation of the steerable wheel(s) 16.

The vehicle 10 includes a prime mover 34 connected to a gear assembly and/or transmission 36 that provides power to one or more of the plurality of wheels 16. The prime mover 34 may be an engine, a motor, a hybrid engine and motor system, or other prime movers known in the art. A rechargeable energy storage system (RESS) may be arranged in the body 12 and may provide power to components within the vehicle (e.g., the prime mover 34). As a non-limiting example, the rechargeable energy storage system may include a battery assembly 38. While specific locations are shown for the prime mover 34, the gear assembly and/or transmission 36, and the battery assembly 38 in FIG. 1, these locations are merely exemplary and not limiting, and locations of these structures may vary.

The vehicle 10 may include a seatbelt 24 for each of the vehicle seats 23. The seatbelt 24 secures a driver or a passenger in the vehicle seat 23. The vehicle 10 may include a B-pillar 21 and an extendable arm assembly 100, 200 according to one or more embodiments mounted on the B-pillar 21. The extendable arm assembly 100, 200 may be a seatbelt presenter and have one end of the seatbelt 24 coupled thereto such that, when the extendable arm assembly 100, 200 is in an extended configuration, the driver or the passenger in the vehicle seat 23 may have easy access to the seatbelt 24 and/or the seatbelt 24 may be in a more comfortable position. The extendable arm assembly 100, 200 may include a stowed configuration in which the extendable arm assembly 100, 200 is stowed within or adjacent to the B-pillar 21. While FIG. 1 shows the extendable arm assembly 100, 200 extending from the B-pillar 21 on the driver side, the extendable arm assembly 100, 200 may extend from the B-pillar 21 on the passenger side and/or may extend from other structures of the vehicle 10 (e.g., C-pillar 27).

Figure 2:
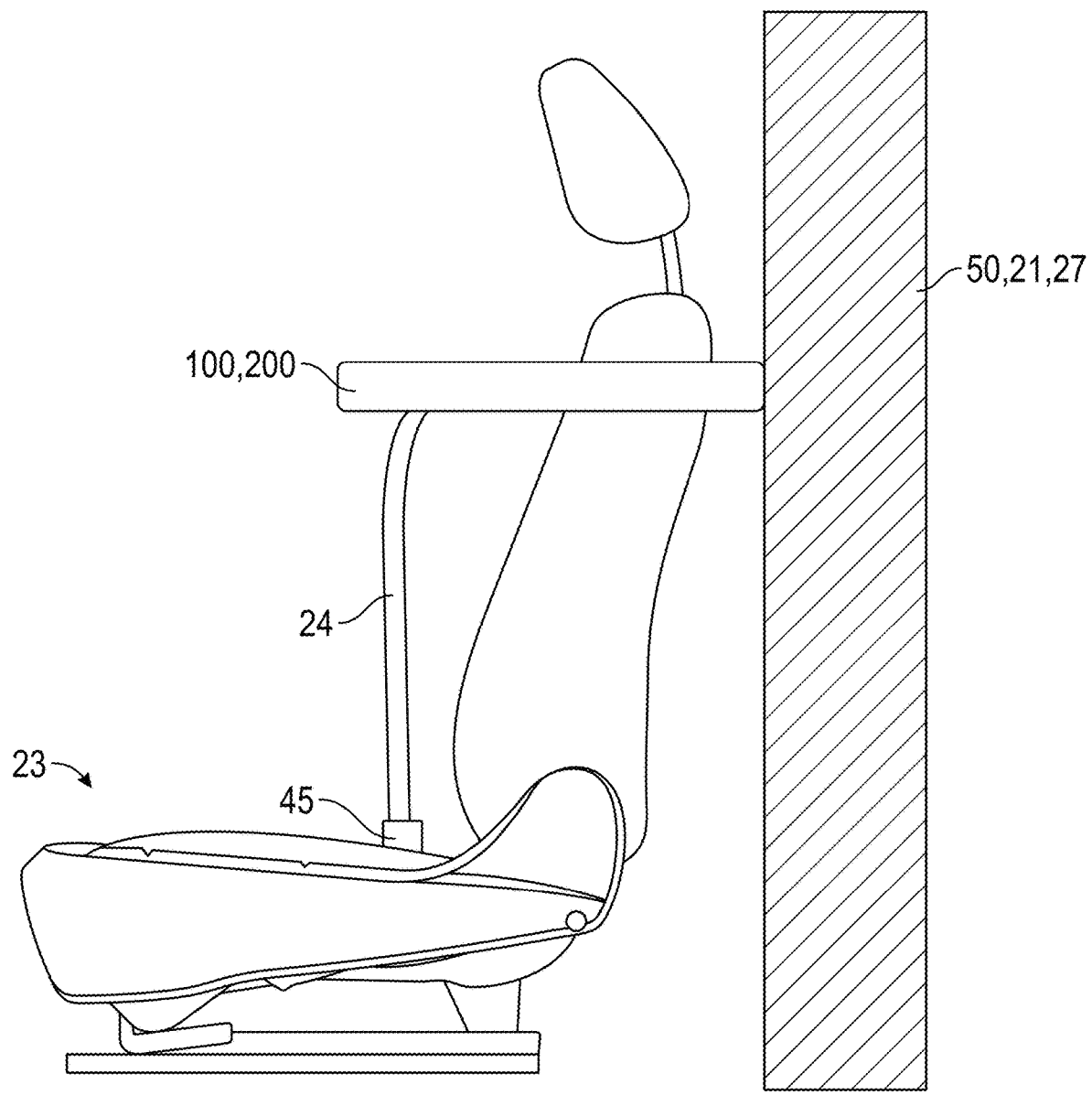
FIG. 2 is a side view of a vehicle seat and an extendable arm assembly according to a non-limiting example.

As shown in FIG. 2, an extendable arm assembly 100, 200 may be mounted on a support structure 50 so as to be extendable from the support structure 50. A seatbelt 24 for a seat 23 may be coupled to the extendable arm assembly 100, 200 and may be removably coupled to a seatbelt buckle 45 on or adjacent to the seat 23. The seat 23 may be any seat, including the vehicle seat 23 as shown in FIG. 1, a wheelchair, or other types of seats. As non-limiting examples, the support structure 50 may be a wall or a pillar (e.g., the B-pillar 23 or the C-pillar 27) of a truck, a van, a bus, or an autonomous vehicle, and the seat 23 may be positioned in front of the support structure 50 to be secured to the support structure 50 via the seatbelt 24 and/or a wheelchair securing structure (not shown) coupled to the extendable arm assembly 100, 200. The seatbelt 24 and the wheelchair securing structure are examples of occupant securing devices. The extendable arm assembly 100, 200 may have an extended configuration as shown in FIG. 2 allowing an occupant of the seat 23 easy access to the seatbelt 24 and/or placing the seatbelt 24 in a more comfortable position. The extendable arm assembly 100, 200 may include a stowed configuration in which the extendable arm assembly 100, 200 is stowed within or adjacent to the support structure 50.

It is noted that, while the extendable arm assembly 100, 200 is shown in FIGS. 1 and 2 coupled to a seatbelt 24, the extendable arm assembly 100, 200 is not limited thereto, and may be used in other applications, including applications outside of vehicles.

Figure 3:
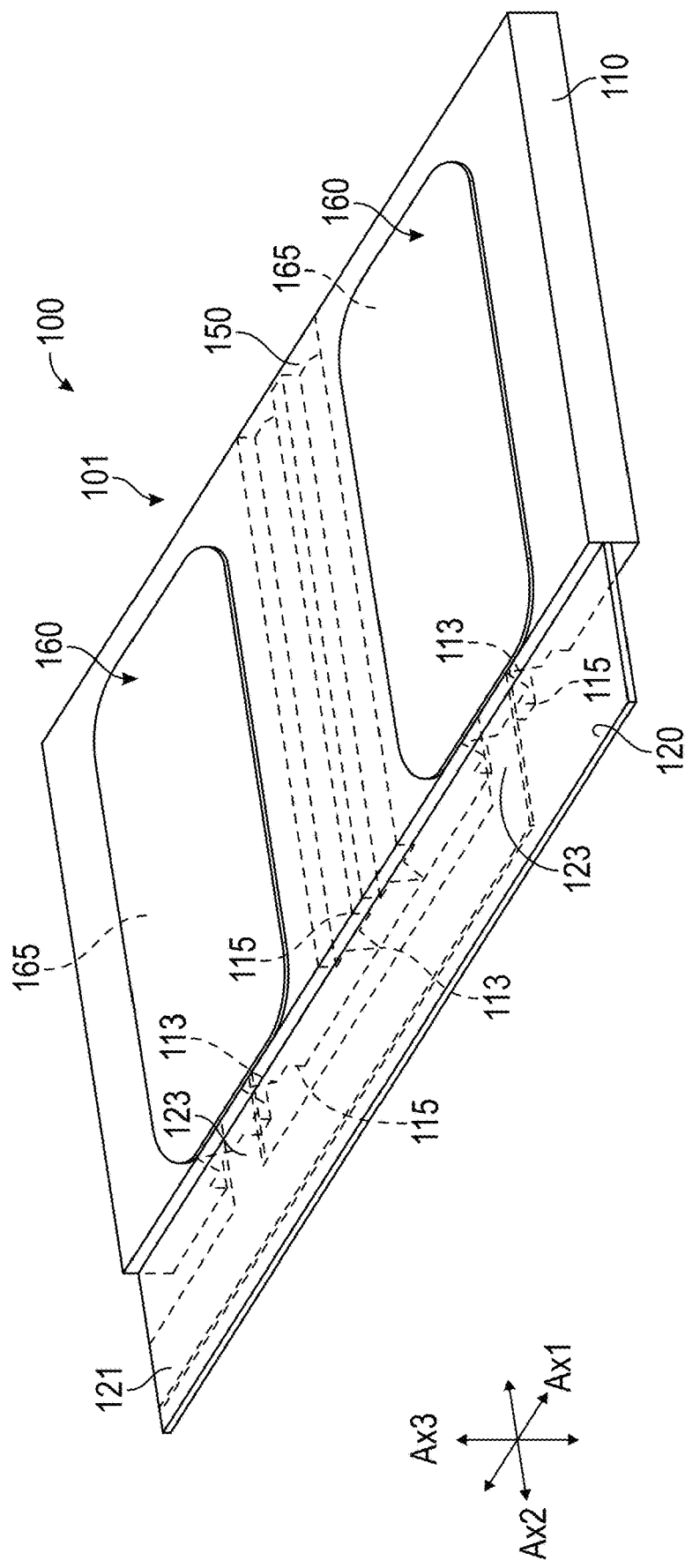
FIG. 3 is a perspective view of an extendable arm assembly according to a non-limiting example.

An embodiment of extendable arm assembly 100 is shown in FIGS. 3 and 4. The extendable arm assembly 100 includes an extendable arm structure 101 that defines a first axis Ax1, a second axis Ax2, and a third axis Ax3. The extendable arm structure 101 includes a main body 110 which may be panel-shaped. The main body 110 may be formed of a rigid or semi-rigid material. As non-limiting examples, the main body 110 may be formed of plastic, metal, composite, or other rigid or semi-rigid materials known in the art. The first axis Ax1 may correspond to a longitudinal direction of the main body 110, the second axis Ax2 may correspond to a width of the main body 110, and the third axis Ax3 may correspond to a thickness of the main body 110. The extendable arm structure 101 may include a first bladder 150 disposed on or about the main body 110. The first bladder 150 may be bonded to the main body 110. The first bladder 150 may be disposed on one or both surfaces of the main body 110 along the first axis Ax1, the second axis Ax2, and/or the third axis Ax3. According to one or more embodiments, the first bladder 150 may surround an entirety of the main body 110 except for a portion attached to a support structure 50. The first bladder 150 may be formed of an airtight material. The first bladder 150 may be made of material with limited elasticity and/or inextensible material (e.g., inextensible fabrics). The first bladder 150 may be an internal bladder for the extendable arm structure 101.

Figure 4A:
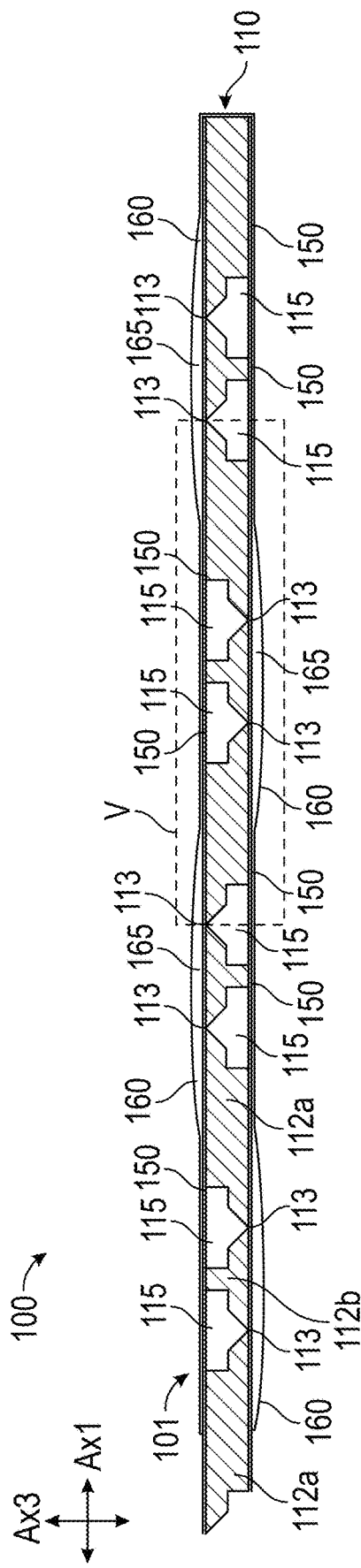
FIG. 4A is a cross-sectional view of an extendable arm assembly according to a non-limiting example.

The main body 110 may define a plurality of hinge portions 113 and a plurality of recesses 115 that are delimited by the main body 110 and the first bladder 150. As shown in FIG. 4A, the recesses 115 may extend between opposite ends of the main body 110 along the second axis Ax2. Along the third axis Ax3, the recesses 115 may be delimited by the first bladder 150 on one end and may terminate at the hinge portions 113 on the other end. Adjacent pairs of recesses 115 may be delimited by the first bladder 150 in the same direction along the third axis Ax3, and the pairs of recesses 115 may alternate between being delimited by the first bladder 150 at one direction along the third axis Ax3 and being delimited by the first bladder 150 at the other direction along the third axis Ax3. The recesses 115 may be a fluid chamber formed between the first bladder 150 and the main body 110. While FIGS. 3 and 4A show a single first bladder 150 around the main body 110, according to one or more embodiments, the main body 110 may include a plurality of first bladders 150, with each of the first bladders 150 being disposed over one or more of the recesses 115.

The extendable arm structure 101 may include a plurality of second bladders 160 disposed on the main body 110. The second bladders 160 may be formed of an airtight material. The second bladder 160 may be made of material with limited elasticity and/or inextensible material (e.g., inextensible fabrics). As shown in FIGS. 3 and 4A, the second bladders 160 may be disposed on outer surfaces of the first bladder 150. Bladder chambers are defined between the second bladders 160 and the outer surface of the first bladder 150. Alternatively, the second bladders may define bladder chambers 165 without the first bladder 150. Each of the second bladders 160 are disposed at a position corresponding to the hinge portions 113. The second bladders 160 operate as extension bladders when the bladder chamber 165 is inflated to thereby extend the extendable arm structure 101 as described herein.

Figure 4C:
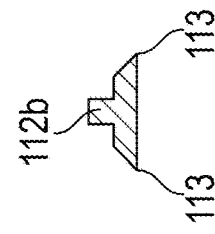
FIG. 4C is a cross-sectional view of a T-shaped tile according to a non-limiting example.
Figure 4B:
FIG. 4B is a cross-sectional view of a plate tile according to a non-limiting example.

The main body 110 may be a unitary structure. Alternatively, the main body 110 may be formed by plate tiles 112a and T-shaped tiles 112b, examples of which are shown in FIGS. 4B and 4C. For example, as illustrated in FIG. 1, the main body 110 may be formed by the plate tiles 112a joined at the hinge portions 113 on each end along the first axis Ax1 to hinge portions 113 on T-shaped tiles 112b. The plate tiles 112a and T-shaped tiles 112b may be oriented differently to form the main body 110 shown in FIG. 4A. The hinge portions 113 of the plate tiles 112a and the T-shaped tiles 112b may be joined via bonding, an adhesive, fastener, or welding. Alternatively, the second bladders 160 spanning the plate tiles 112a and the T-shaped tiles 112b may keep the plate tiles 112a and the T-shaped tiles 112b in position.

Figure 15A:
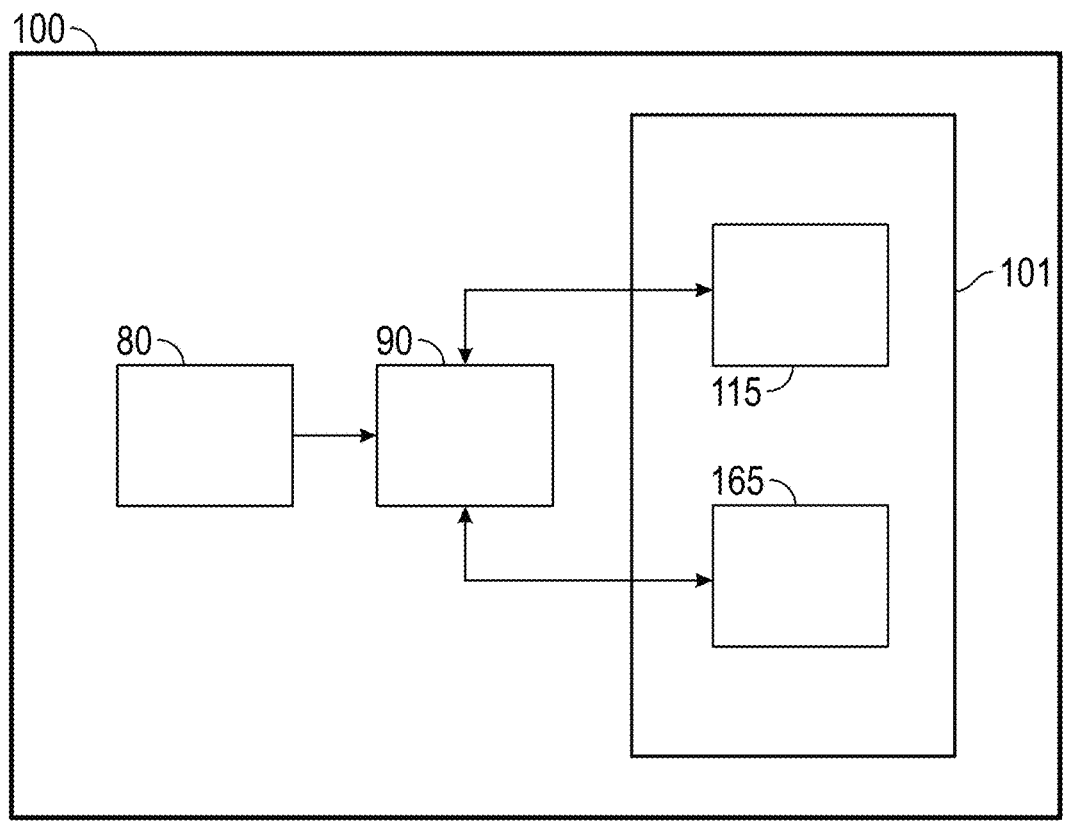
FIG. 15A is a schematic diagram of an extendable arm assembly according to a non-limiting example.

As shown in FIG. 15A, the extendable arm assembly 100 may include a pneumatic transfer device 90 fluidly coupled to the recesses 115 and/or the bladder chambers 165. The pneumatic transfer device 90 may transfer fluid (e.g., air) into and out of the recesses 115 and/or the bladder chambers 165. That is, the pneumatic transfer device 90 may inflate or apply vacuum to the recesses 115 and/or the bladder chambers 165. The extendable arm assembly 100 may include a controller 80 programmed to control the pneumatic transfer device 90 to inflate, apply vacuum, and/or vent the recesses 115 and/or the bladder chambers 165. The pneumatic transfer device 90 may be a blower, a pump, a fan, or other pneumatic transfer devices known in the art. The pneumatic transfer device 90 may include several pneumatic transfer devices. The pneumatic transfer device 90 may actively inflate the recesses 115 and/or the bladder chambers 165, may be turned off such that the recesses 115 and/or the bladder chambers 165 are vented, or may actively apply vacuum to the recesses 115 and/or the bladder chambers 165. When the recesses 115 and/or the bladder chambers 165 are vented, they may equalize with atmospheric pressure.

Figure 15B:
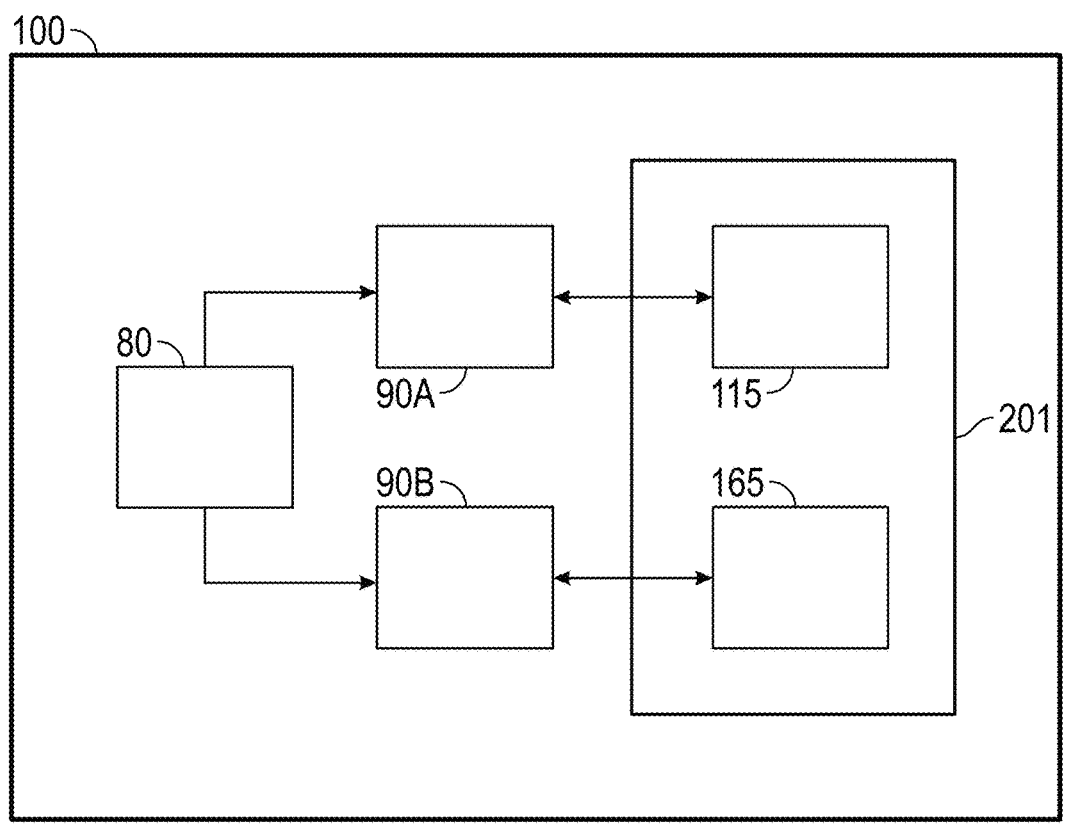
FIG. 15B is a schematic diagram of an extendable arm assembly according to a non-limiting example.

As shown in FIG. 15B, the extendable arm assembly 100 may include a first pneumatic transfer device 90A fluidly coupled to the recesses 115 and a second pneumatic transfer device 90B coupled to the bladder chambers 165. The first pneumatic transfer device 90A may transfer fluid (e.g., air) into and out of the recesses 115, and the second pneumatic transfer device 90B may transfer fluid (e.g., air) into and out of the bladder chambers 165. That is, the first pneumatic transfer device 90A may inflate or apply vacuum to the recesses 115, and the second pneumatic transfer device 90B may inflate or apply vacuum to the bladder chambers 165. The extendable arm assembly 100 may include a controller 80 programmed to control the first and second pneumatic transfer devices 90A, 90B to inflate, apply vacuum, and/or vent the recesses 115 and/or the bladder chambers 165. The first and second pneumatic transfer devices 90A, 90B may be blowers, pumps, fans, or other pneumatic transfer devices known in the art. The first and second pneumatic transfer devices 90A, 90B may actively inflate the recesses 115 and/or the bladder chambers 165, may be turned off such that the recesses 115 and/or the bladder chambers 165 are vented, or may actively apply vacuum to the recesses 115 and/or the bladder chambers 165.

The extendable arm assembly 100 may include one or more pressure sensors (not shown) that monitors pressures within the recesses 115 and/or the bladder chambers 165. The controller 80 may receive and monitor the pressures sensed by the one or more pressure sensors. The controller 80 may compare the pressure(s) sensed by the one or more pressure sensors with a desired pressure(s) and control the pneumatic transfer device 90, the first pneumatic transfer device 90A, and/or second pneumatic transfer device 90B to maintain the desired pressure(s) within the recesses 115 and/or the bladder chambers 165.

As shown in FIG. 3, the extendable arm assembly 100 may include a flowpath structure 120 that includes one or more flowpaths 121 fluidly coupled to each of the bladder chamber 165 via fluid couplings 123. The flowpath structure 120 may fluidly couple the bladder chambers 165 to the pneumatic transfer device 90 or the second pneumatic transfer device 90B. The flowpath structure 120 may be integrally formed with the second bladders 160.

Figure 5A:
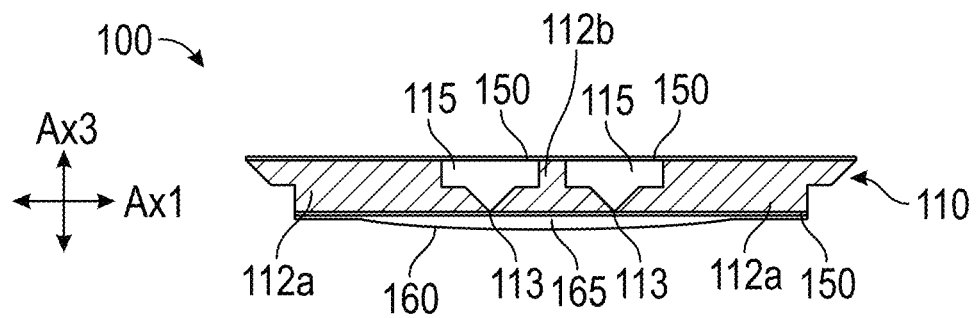
FIG. 5A is a portion of the extendable arm assembly indicated by "V" in FIG. 4A in an extended configuration.

As shown in FIG. 5A, the bladder chamber 165 may be inflated to straighten the plate tiles 112a and the T-shaped tiles 112b of the main body 110. The recesses 115 may also be inflated to aid in straightening the portions of the main body. Alternatively, the recesses 115 may be vented.

Figure 5B:
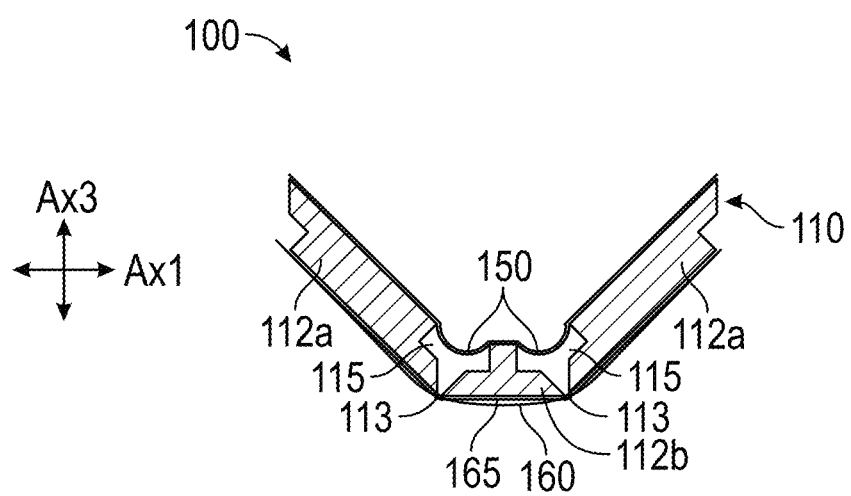
FIG. 5B is a portion of the extendable arm assembly indicated by "V" in FIG. 4A in an intermediate configuration.

As shown in FIG. 5B, vacuum is applied to the first bladder 150 thereby applying vacuum to the recesses 115 to change orientation of the plate tiles 112a and the T-shaped tiles 112b relative to one another, thereby folding the main body 110. The bladder chamber 165 may also have vacuum applied to aid in folding the plate tiles 112a and the T-shaped tiles 112b of the main body 110 about the recesses 115. Alternatively, the bladder chamber 165 may be vented.

As shown in FIGS. 6A-7D, the extendable arm structure 101 of the extendable arm assembly 100 may be mounted to a support structure 50 at one end thereof along the first axis Ax1. By mounting different portions of the extendable arm structure 101 to the support structure 50, different stowing configurations may be achieved (see FIGS. 6D and 7D).

Figure 8A:
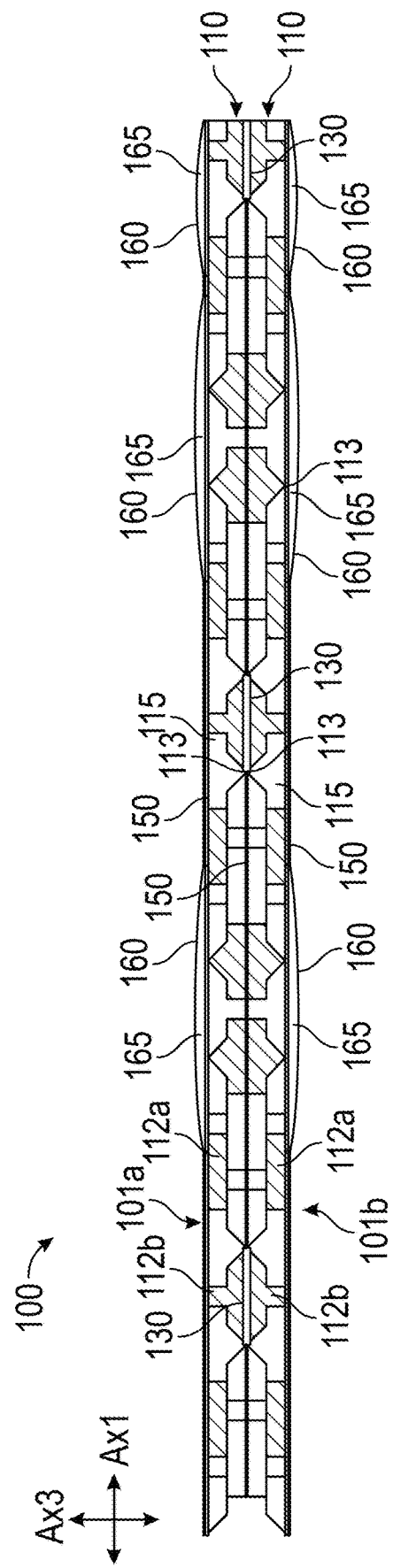
FIG. 8A is an explanatory view of an extendable arm assembly in an extended configuration according to a non-limiting example.
Figure 8B:
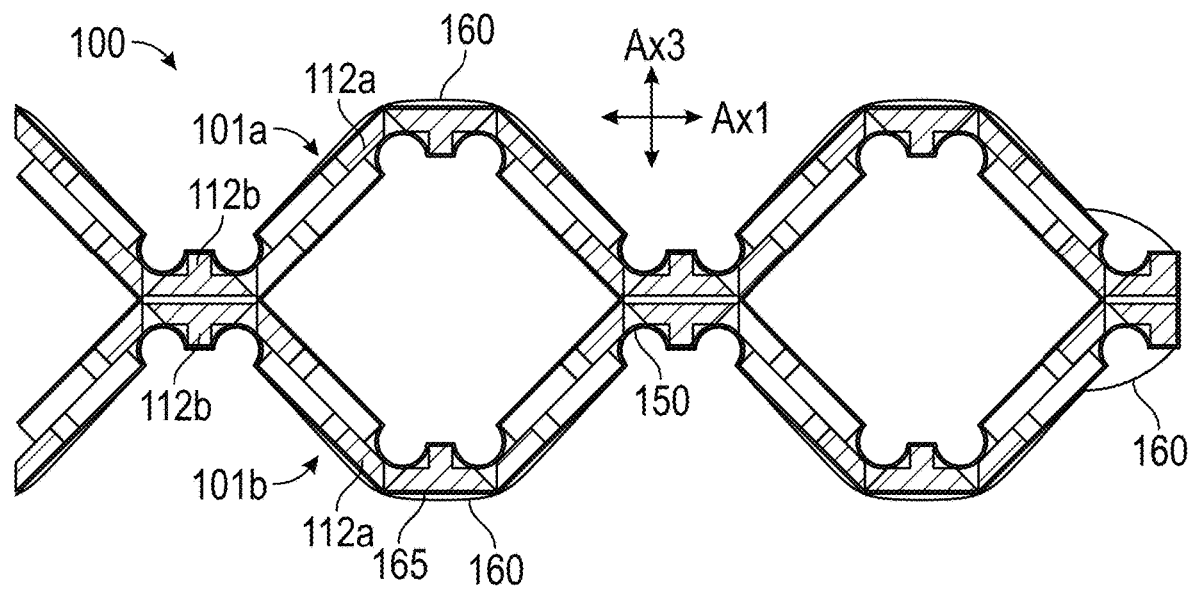
FIG. 8B is an explanatory view of an extendable arm assembly in an intermediate configuration according to a non-limiting example.
Figure 8C:
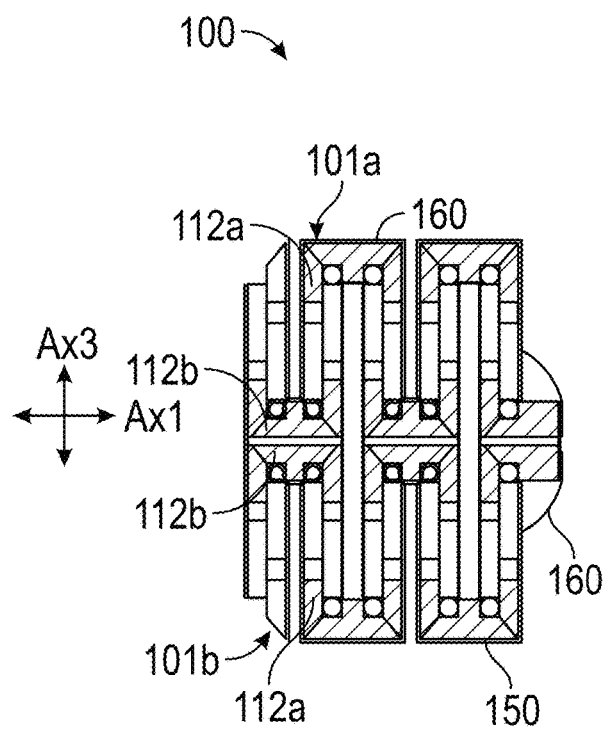
FIG. 8C is an explanatory view of an extendable arm assembly in a stowed configuration according to a non-limiting example.

According to one or more embodiments, as shown in FIGS. 8A-8C, the extendable arm assembly 100 may include a first extendable arm structure 101a attached to a second extendable arm structure 101b via adhesives 130 applied between T-shaped tiles 112b or other bonding methods (e.g., ultrasonic welding, heat sealing, etc.). Each of the first and second extendable arm structures 101a, 101b may correspond to the extendable arm structure 101 described above, although the second bladders 160 may be omitted on sides of the first and second extendable arm structures 101a, 101b that are adjacent to each other. As a non-limiting example, the first extendable arm structure 101a and the second extendable arm structure 101b may be corresponding structures that are flipped with respect to the first axis Ax1. The adhesives 130 may be disposed between adjacent hinge portions 113 of each of the first and second extendable arm structures 101a, 101b.

According to one or more embodiments, as shown in FIGS. 9A-9D, the extendable arm assembly 100 may include a first extendable arm structure 101a, a second extendable arm structure 101b, and a third extendable arm structure 101c. The second extendable arm structure 101b and the third extendable arm structure 101c may be mounted on opposite sides of the first extendable arm structure 101a via adhesives 130. The adhesives 130 may be disposed between adjacent hinge portions 113 of each of the first and second extendable arm structures 101a, 101b and adjacent hinge portions 113 of each of the first and third extendable arm structures 101a, 101c. In the embodiment shown in FIGS. 9A-9D, the second bladders 160 and/or the first bladders 160 may be omitted from the first extendable arm structure 101a such that the first extendable arm structure 101a may be passively actuated by the second and third extendable arm structures 101b, 101c. The third extendable arm structure 101c may be shorter than the first and second extendable arm structures 101a, 101b along the first axis Ax1 such that an exposed portion of the first extendable arm structure 101a is not mounted on the third extendable arm structure 101c, and a second bladder 160 may be disposed on the exposed portion.

FIGS. 6A, 7A, 8A, and 9A show the extendable arm assembly 100 in an extended configuration. The extended configuration may be achieved by inflating the bladder chambers 165 of the second bladders 160 as described above with respect to FIG. 5A. FIGS. 6D, 7D, 8C, and 9C show the extendable arm assembly 100 in a stowed configuration. The stowed configuration of the extendable arm assembly 100 may be achieved by applying vacuum to the first bladders 150 and/or the second bladders 160 as described herein with respect to FIG. 5B. FIGS. 6B, 6C, 7B, 7C, 8B, and 9B show intermediate configurations between the extended and stowed configurations. The extendable arm assembly 100 may be in the stowed configuration shown in FIGS. 6D, 7D, 8C, and 9C when not in use, and may be actuated to the extended configuration shown in FIGS. 6A, 7A, 8A, and 9A during use as described above. The extendable arm assembly 100 may subsequently be returned to the stowed configuration shown in FIGS. 6D, 7D, 8C, and 9C.

Figure 6C:
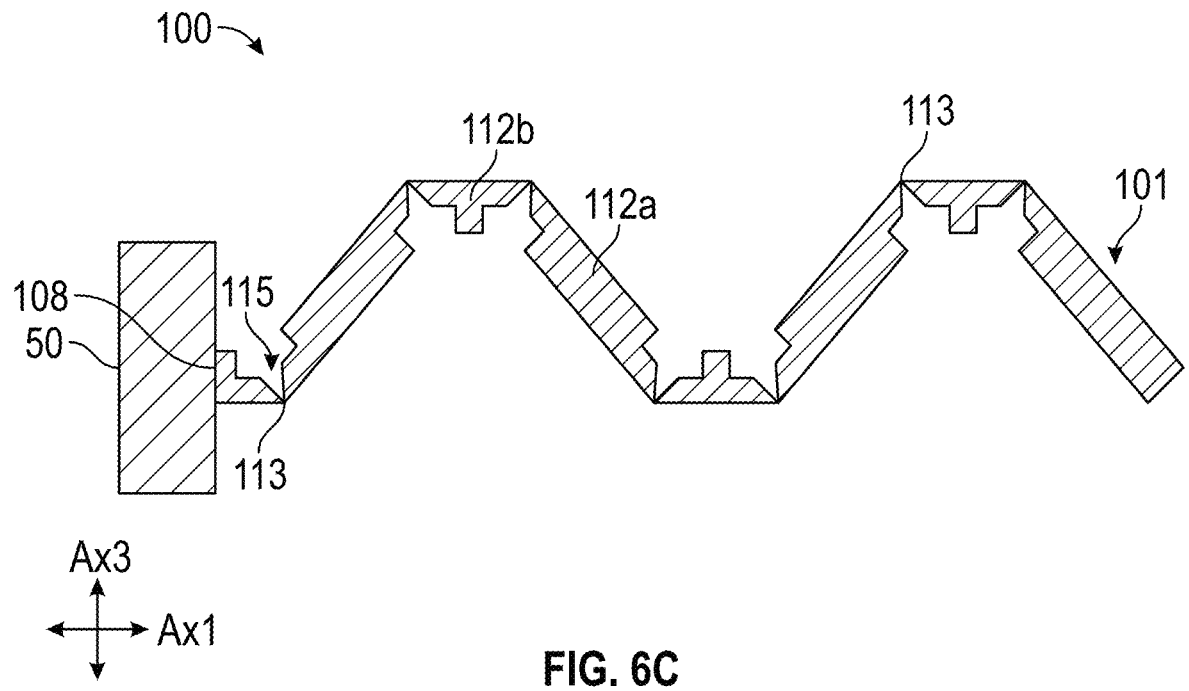
FIG. 6C is an explanatory view of the extendable arm assembly of FIG. 6A in an intermediate configuration.
Figure 6D:
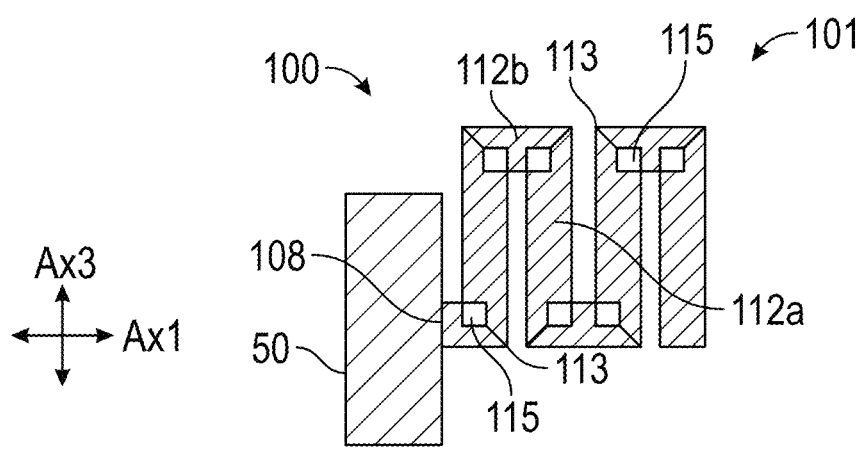
FIG. 6D is an explanatory view of the extendable arm assembly of FIG. 6D in a stowed configuration.
Figure 7D:
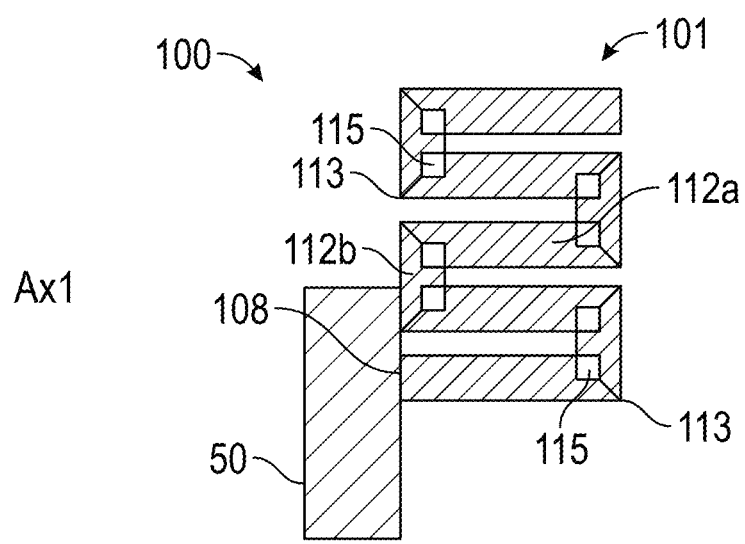
FIG. 7D is an explanatory view of the extendable arm assembly of FIG. 7A in a stowed configuration.

The extendable arm assembly 100 may be mounted on the support structure 50 at a position adjacent to a single recess 115 as shown in FIGS. 6A-6D to achieve the stowed configuration shown in FIG. 6D or mounted on the support structure 50 at a position that is not adjacent to a recess 115 as shown in FIGS. 7A-7D to achieve the stowed configuration shown in FIG. 7D.

By including the first extendable arm structure 101*a* and the second extendable arm structure 101*b* attached to each other as shown in FIGS. 8A-8C, a combination of the first extendable arm structure 101*a* and the second extendable arm structure 101*b* may be more rigid in the extended configuration shown in FIG. 8A than a single extendable arm structure 101. By including the first extendable arm structure 101*a*, the second extendable arm structure 101*b*, and the third extendable arm structure 101*c* attached to each other as shown in FIGS. 9A-9C, a combination of the first extendable arm structure 101*a*, the second extendable arm structure 101*b*, and the third extendable arm structure 101*c* may be more rigid in the extended configuration shown in FIG. 9A than a single extendable arm structure 101 or a combination of the first extendable arm structure 101*a* and the second extendable arm structure 101*b*. The second extendable arm structure 101*b* and/or the third extendable arm structure 101*c* provides additional first bladders 150 and second bladders 160 providing increased output force during extension and retraction.

Additionally, the combination of the first extendable arm structure 101*a*, the second extendable arm structure 101*b*, and the third extendable arm structure 101*c* may allow for varying degrees of freedom in intermediate configurations between the stowed configuration and the extended configuration. A non-limiting example is described with reference to FIGS. 10-11G.

Figure 10:
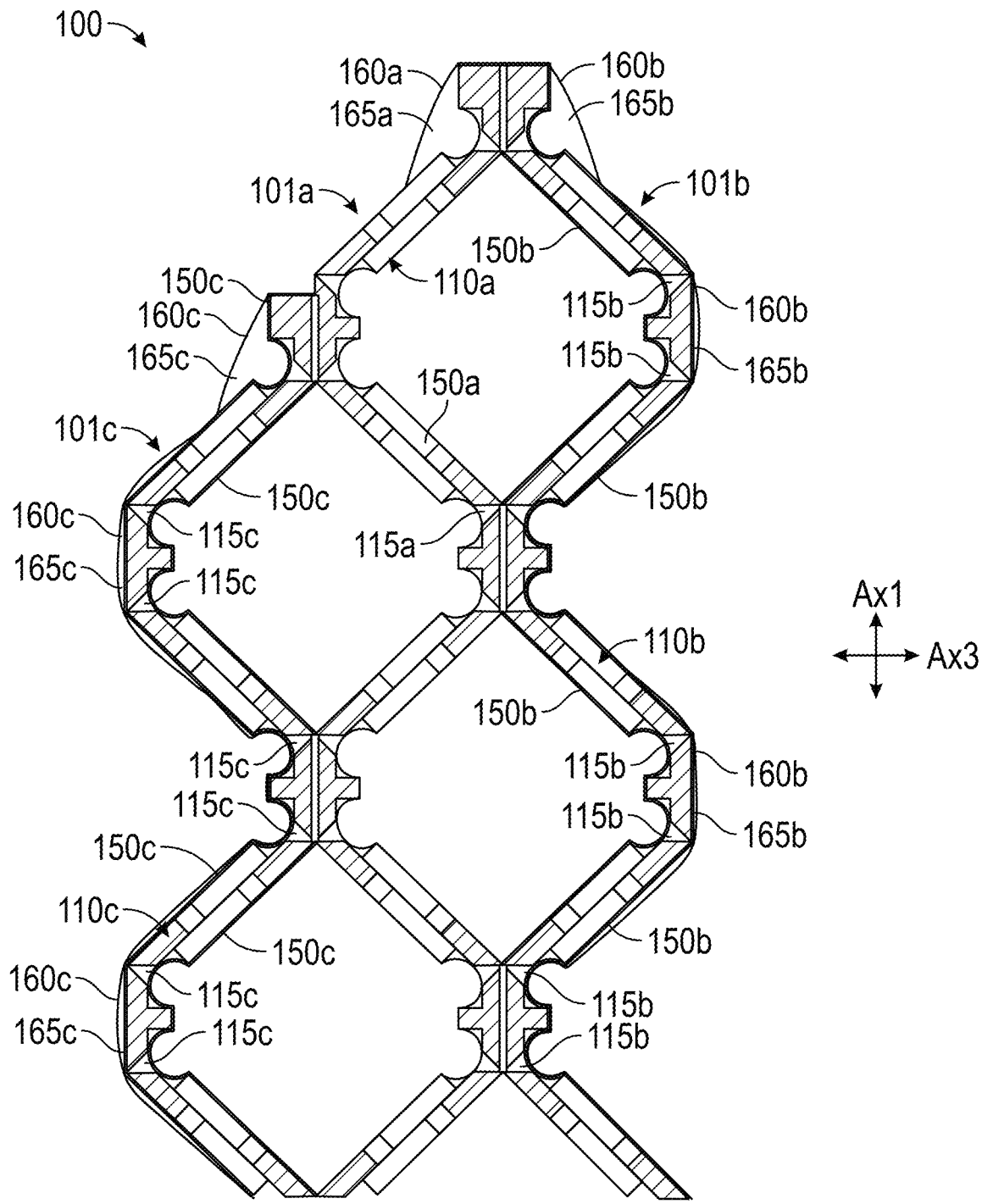
FIG. 10 is a cross-sectional view of an extendable arm assembly according to a non-limiting example.

The extendable arm assembly 100 corresponding to that shown in FIGS. 9A-9C is shown in FIG. 10. Each of the second extendable arm structure 101*b* and the third extendable arm structure 101*c* may include a main body 110*b*, 110*c*, a first bladder 150*b*, 150*c* disposed on the main body 110*b*, 110*c* covering recesses 115*b*, 115*c*, and second bladders 160*b*, 160*c* that define bladder chambers 165*b*, 165*c* therein. According to one or more embodiments, the pneumatic transfer device 90, the first pneumatic transfer device 90A, and/or the second pneumatic transfer device 90B shown in FIGS. 15A and 15B may have at least the following settings for applying a vacuum or inflating the recesses 115*b*, 115*c* and the bladder chambers 165*b*, 165*c*: an off setting for venting, a first vacuum setting, a second vacuum setting that generates a higher vacuum force than the first vacuum setting, a third vacuum setting that generates a higher vacuum force than the second vacuum setting, a first inflation setting, a second inflation setting that generates a higher pressure than the first inflation setting, and a third inflation setting that generates a higher pressure than the second inflation setting. The above settings may allow for extension and retraction along the first axis Ax1 as well as for movement along the third axis Ax3 as shown in FIGS. 11A-11G. The extendable arm assembly 100 may allow for full analog control of inflation and/or vacuum at any intermediate configuration between the retracted and extended configurations by controlling the vacuum, inflation, and venting of the recesses 115*b*, 115*c*, and the bladder chambers 165*b*, 165*c*.

FIG. 11A shows the extendable arm assembly 100 attached to a support structure 50 and in a stowed configuration. In the stowed configuration, the recesses 115*b*, 115*c* of the second and third extendable arm structures 101*b* may have vacuum applied at any of the first, second or third vacuum settings, and the bladder chambers 165*b*, 165*c* of the second and third extendable arm structures 101*b* may be vented with the off setting.

FIG. 11B shows the extendable arm assembly 100 in a first intermediate configuration. In the first intermediate configuration, the recesses 115*b* of the second extendable arm structures 101*b* may have vacuum applied at the first vacuum setting, the recesses 115*c* of the third extendable arm structures 101*c* may have vacuum applied with the second vacuum setting, the bladder chambers 165*b* of the second extendable arm structure 101*b* may be inflated at the first inflation setting, and the bladder chambers 165*c* of the third extendable arm structure 101*c* may be vented with the off setting.

FIG. 11C shows the extendable arm assembly 100 in a second intermediate configuration. In the second intermediate configuration, the recesses 115*b* of the second extendable arm structures 101*b* may have vacuum applied at the third vacuum setting, the recesses 115*c* of the third extendable arm structures 101*c* may have vacuum applied with the third vacuum setting, the bladder chambers 165*b* of the second extendable arm structure 101*b* may be inflated at the third inflation setting, and the bladder chambers 165*c* of the third extendable arm structure 101*c* may be inflated at the first inflation setting.

FIG. 11D shows the extendable arm assembly 100 in a third intermediate configuration. In the third intermediate configuration, the recesses 115*b* of the second extendable arm structures 101*b* may have vacuum applied at the first vacuum setting, the recesses 115*c* of the third extendable arm structures 101*c* may have vacuum applied with the third vacuum setting, the bladder chambers 165*b* of the second extendable arm structure 101*b* may be inflated with the third inflation setting, and the bladder chambers 165*c* of the third extendable arm structure 101*c* may be inflated with the third inflation setting.

FIG. 11E shows the extendable arm assembly 100 in a fourth intermediate configuration. In the fourth intermediate configuration, the recesses 115*b* of the second extendable arm structures 101*b* may have vacuum applied with the first vacuum setting, the recesses 115*c* of the third extendable arm structures 101*c* may have vacuum applied with the first vacuum setting, the bladder chambers 165*b* of the second extendable arm structure 101*b* may be inflated with the third inflation setting, and the bladder chambers 165*c* of the third extendable arm structure 101*c* may be inflated with the third inflation setting.

Figure 11F:
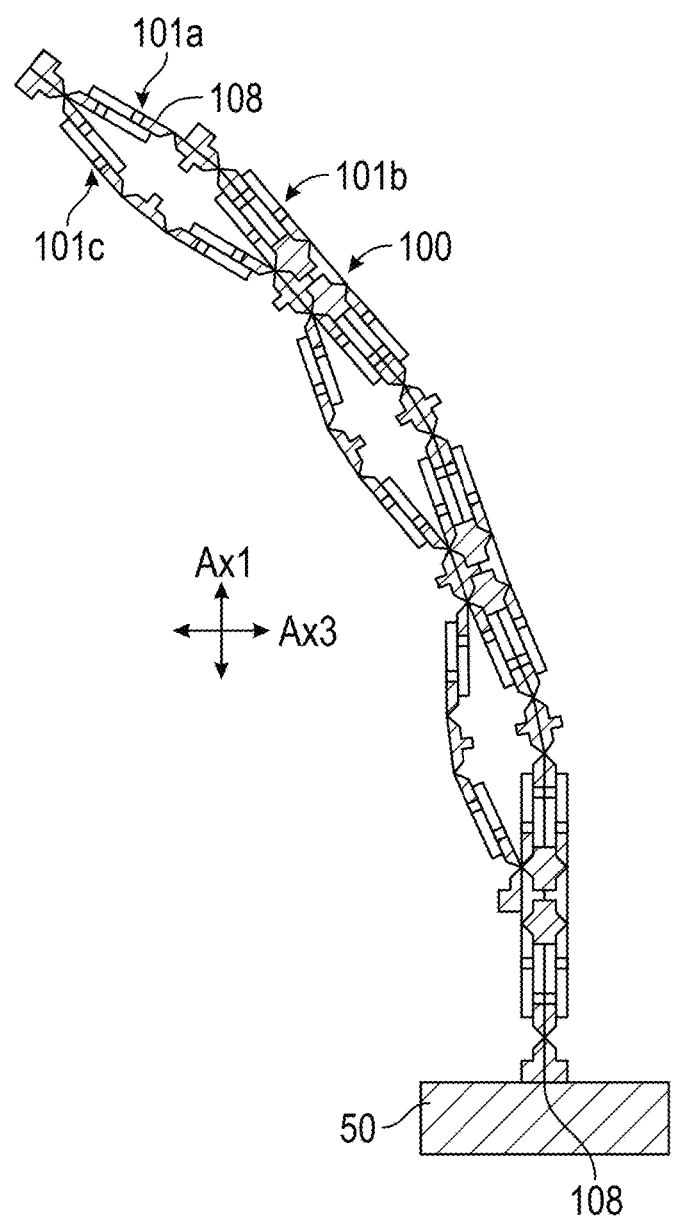
FIG. 11F is an explanatory view of an extendable arm assembly in an intermediate configuration according to a non-limiting example.

FIG. 11F shows the extendable arm assembly 100 in a fifth intermediate configuration. In the fifth intermediate configuration, the recesses 115*b* of the second extendable arm structures 101*b* may be vented with the off setting, the recesses 115*c* of the third extendable arm structures 101*c* may have vacuum applied with the first vacuum setting, the bladder chambers 165*b* of the second extendable arm structure 101*b* may be inflated with the third inflation setting, and the bladder chambers 165*c* of the third extendable arm structure 101*c* may be inflated with the third inflation setting.

Figure 11G:
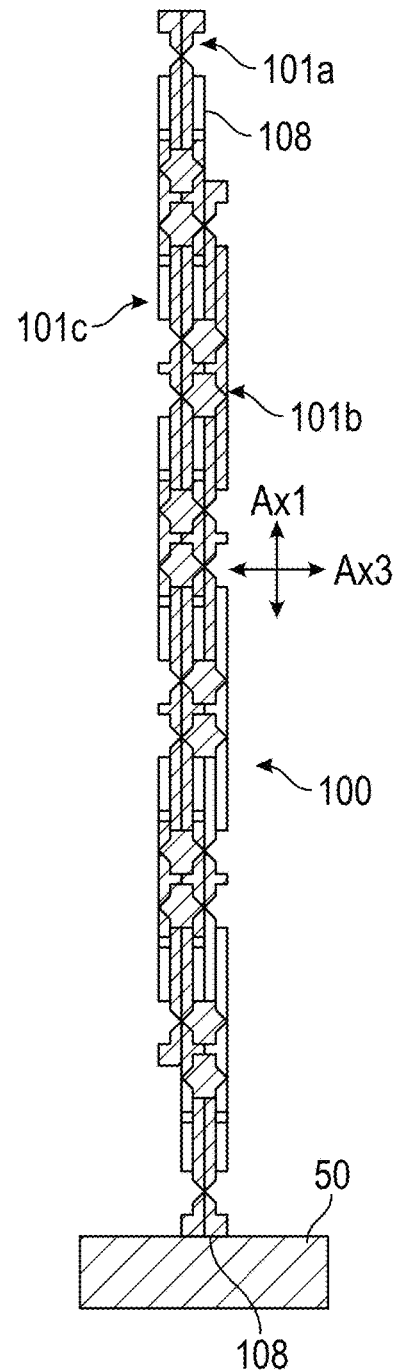
FIG. 11G is an explanatory view of an extendable arm assembly in an extended configuration according to a non-limiting example.

FIG. 11G shows the extendable arm assembly 100 in an extended configuration. In the extended configuration, the recesses 115*b* of the second extendable arm structures 101*b* may be vented with the off setting, the recesses 115*c* of the third extendable arm structures 101*c* may be vented with the off setting, the bladder chambers 165*b* of the second extendable arm structure 101*b* may be inflated with any of the first, second and third inflation settings, and the bladder chambers 165*c* of the third extendable arm structure 101*c* may be inflated with any of the first, second and third inflation settings.

Referring to FIG. 10, the first extendable arm structure 101*a* may include a main body 110*a* a first bladder 150*a* disposed on the main body 110*a* covering recesses 115*a*, and a second bladder 160*a* on the main body 110*a* on the first bladder 150a that define a bladder chamber 165a therein. According to a non-limiting example, the first extendable arm structure 101a may be passively actuated by the second and third extendable arm structures 101b, 101c such that the recesses 115a are not vacuumed or inflated. The bladder chamber 165a of the first extendable arm structure 101a may be inflated together with the bladder chambers 165b of the second extendable arm structure 101b.

By extending the extendable arm assembly 100 from the stowed configuration in FIG. 11A to the extended configuration shown in FIG. 11G via the process described above with respect to FIGS. 11A-11G, the extendable arm assembly 100 may move only on one side (left side in FIGS. 11A-11G) throughout the extension process so as to not encroach on the other side (right side in FIGS. 11A-11F). Such a process may useful if, for example, a user of the extendable arm assembly 100 is positioned on the second side, as the extendable arm assembly 100 may be extended while avoiding the user.

Figure 12A:
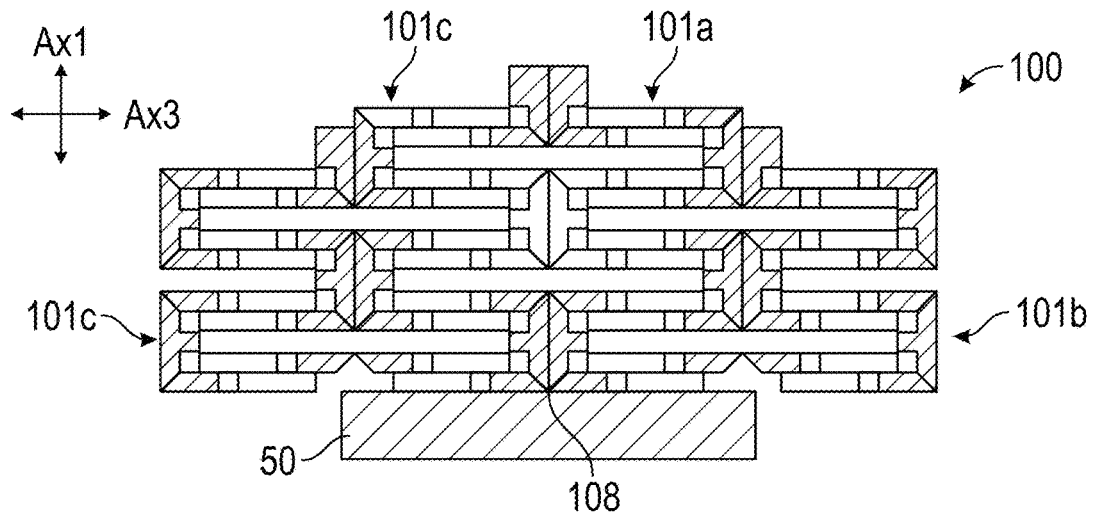
FIG. 12A is an explanatory view of an extendable arm assembly in an stowed configuration according to a non-limiting example.
Figure 12B:
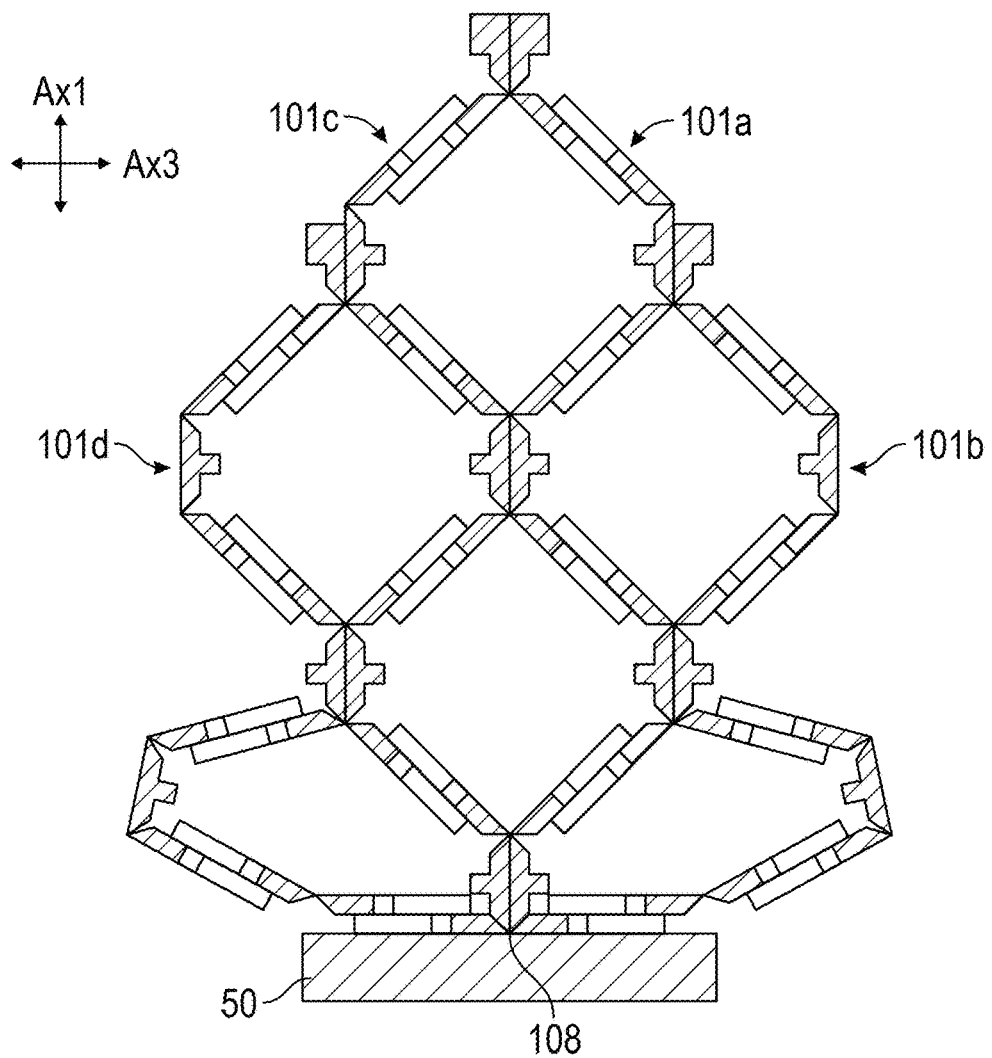
FIG. 12B is an explanatory view of an extendable arm assembly in an intermediate configuration according to a non-limiting example.
Figure 12C:
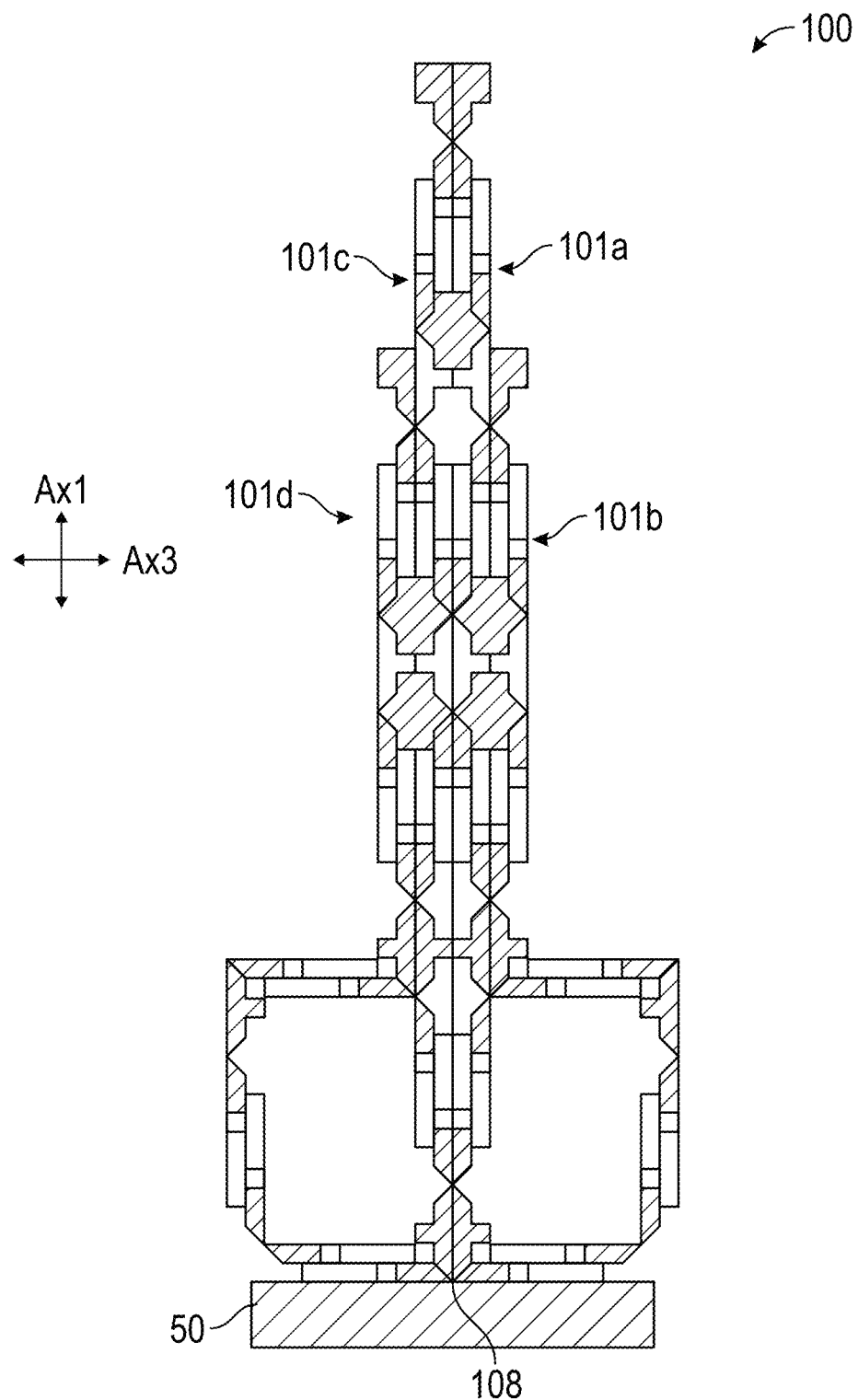
FIG. 12C is an explanatory view of an extendable arm assembly in an extended configuration according to a non-limiting example.
Figure 13A:
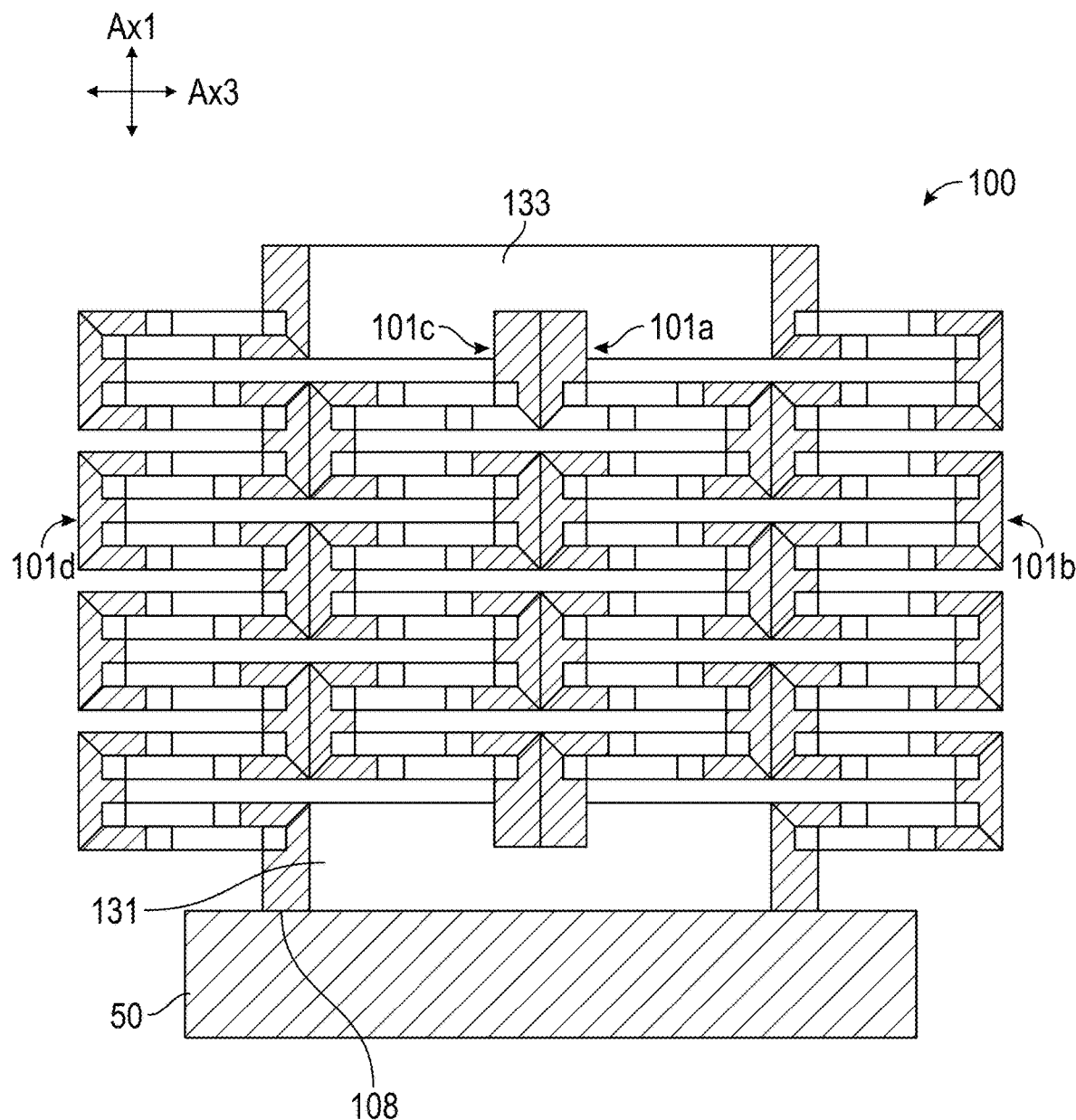
FIG. 13A is an explanatory view of an extendable arm assembly in a stowed configuration according to a non-limiting example.
Figure 13B:
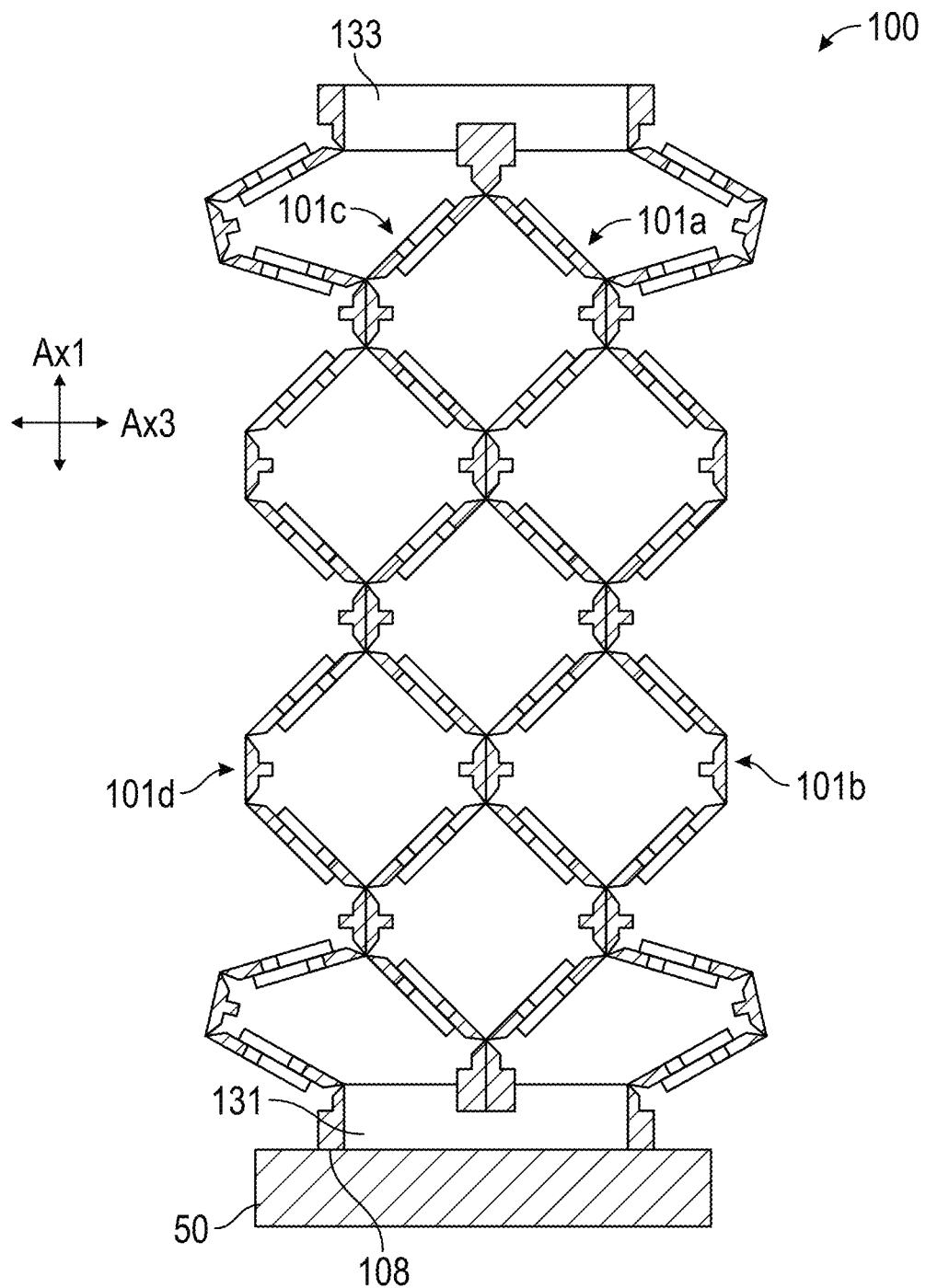
FIG. 13B is an explanatory view of an extendable arm assembly in an intermediate configuration according to a non-limiting example.
Figure 13C:
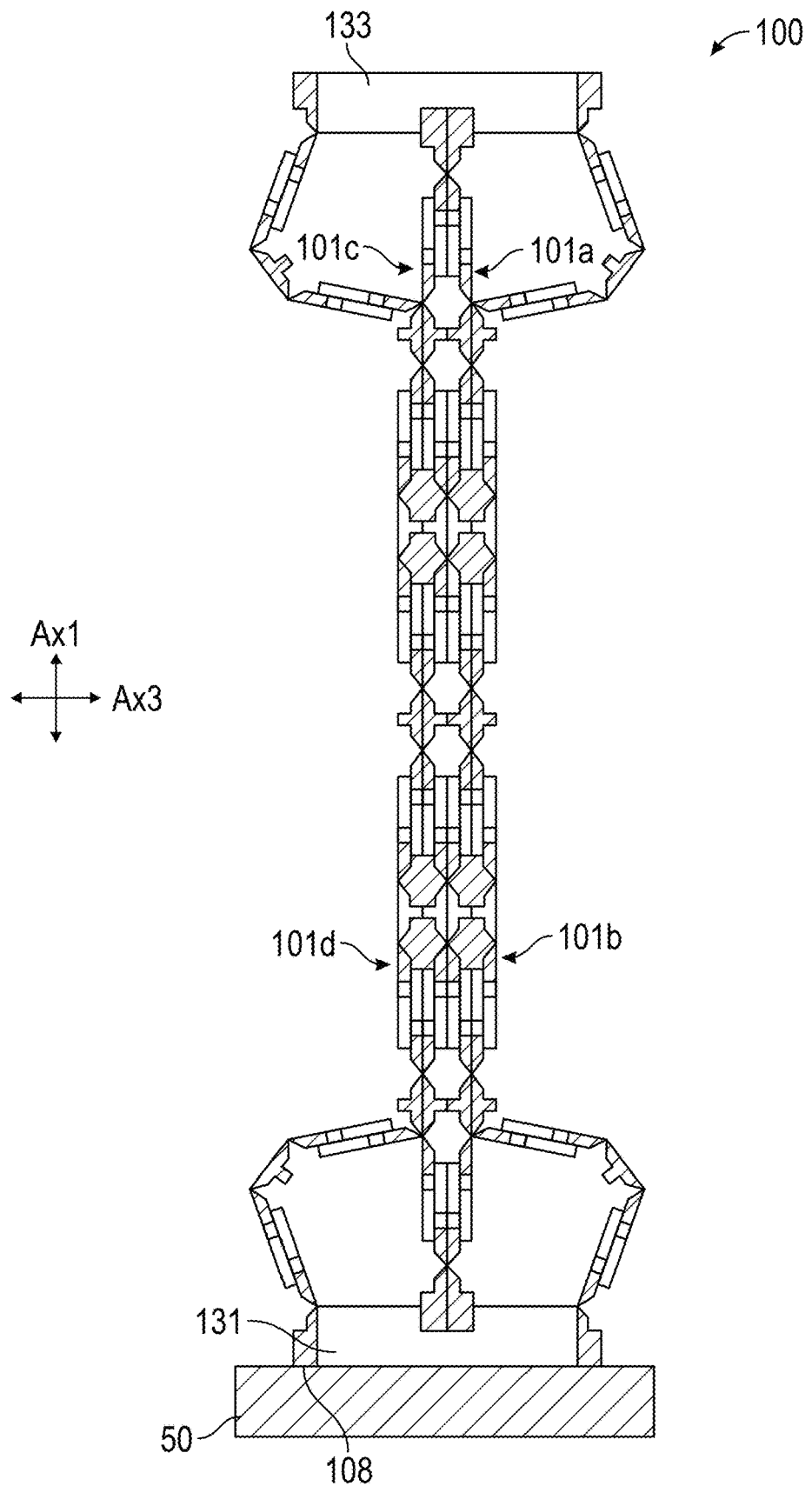
FIG. 13C is an explanatory view of an extendable arm assembly in an extended configuration according to a non-limiting example.

As shown in FIGS. 12A-12C and 13A-13C, the extendable arm assembly 100 may include first, second, third and fourth extendable arm structures 101a, 101b, 101c, 101d. The embodiment shown in FIGS. 13A-13C includes a proximate block 131 and a terminal block 133 that respectively anchor proximate and terminal ends of the first, second, third, and fourth extendable arm structures 101a, 101b, 101c, 101d together to improve stability and end-point control. FIGS. 12A and 13A show the extendable arm assembly 100 in a stowed configuration, FIGS. 12B and 13B show the extendable arm assembly 100 in an intermediate configuration, and FIGS. 12C and 13C show the extendable arm assembly 100 in an extended configuration. The four extendable arm structures 101 shown in FIGS. 12A-12C and 13A-13C may form a symmetric antagonistic array that balances actuation capabilities and provides a more robust end attachment option while having excellent extension and sweeping capabilities.

Figure 14:
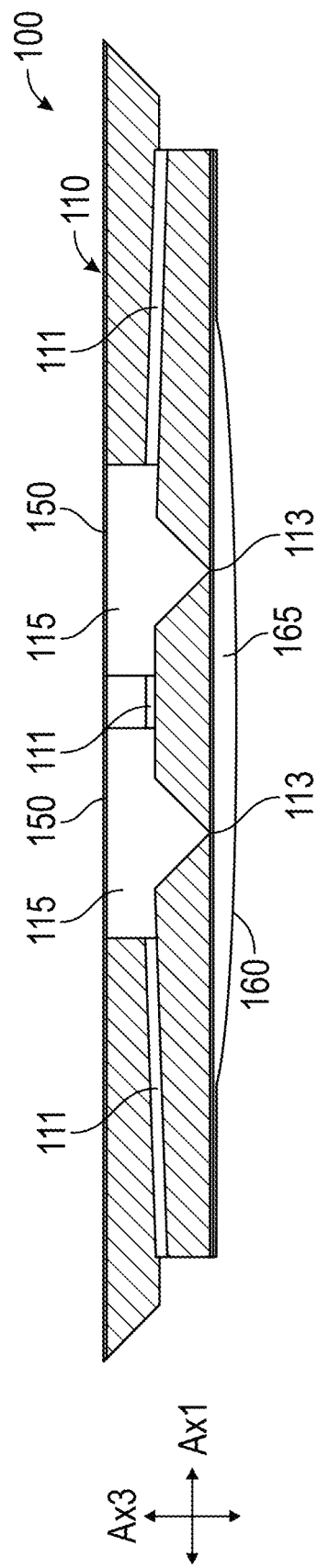
FIG. 14 is a cross-sectional view of a portion of an extendable arm assembly according to a non-limiting example.

Referring to FIG. 14, the main body 110 may include an inner flowpath 111 therein extending along the first axis Ax1 that fluidly connects the recesses 115. The pneumatic transfer device 90 shown in FIG. 15A and/or the first pneumatic transfer device 90A shown in FIG. 15B may provide a vacuuming force or an inflation pressure to a proximate end 108 of the main body 110, and the vacuum force or the inflation pressure may be applied to each of the recesses 115 via the inner flowpath 111. The proximate end 108 of the main body 110 may be an end of the main body 110 mounted on the support structure 50 (see, e.g., FIGS. 2 and 6A-7D). That is, fluid may flow in and out of the recesses 115b that are fluidly connected to each other via the proximate end 108 via, e.g., a fluid inlet positioned at the support structure 50. Alternatively or additionally, the main body 110 may be formed of a porous material or may be formed with apertures connecting the recesses 115 such that the vacuum force or the inflation pressure may be applied to each of the recesses 115b from the proximate end 108.

An embodiment of an extendable arm assembly 200 is shown in FIG. 16. The extendable arm assembly 200 includes an extendable arm structure 201 that defines a first axis Ax1, a second axis Ax2, and a third axis Ax3. A proximate end 208 of the extendable arm structure 201 is attached to a support structure 50 and includes a plurality of expandable cells 210, each of which includes a plurality of side panels 211 and end caps 213. The end caps 213 may be formed as flexible structures that are able to collapse and expand. The end caps 213 are configured to fluidly seal open ends of the expandable cells 210. As a non-limiting example, each of the expandable cells 210 may include four of the side panels 211 forming a square cylinder and two of the end caps 213 on ends of the square cylinder. A cell chamber 215 is delimited by the side panels 211 and the end caps 213 of the expandable cells 210 (see FIG. 17B). The expandable cells 210 may be connected at hinge portions H.

Figure 19C:
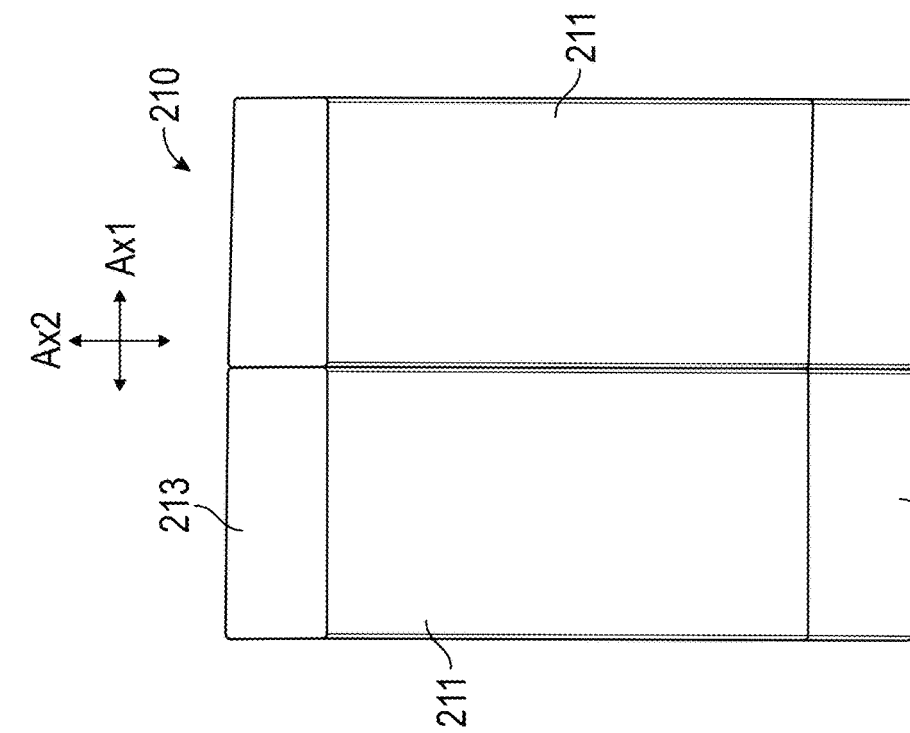
FIG. 19C is a perspective view of the expandable cell of an extendable arm assembly in an extended configuration according to a non-limiting example.
Figure 19B:
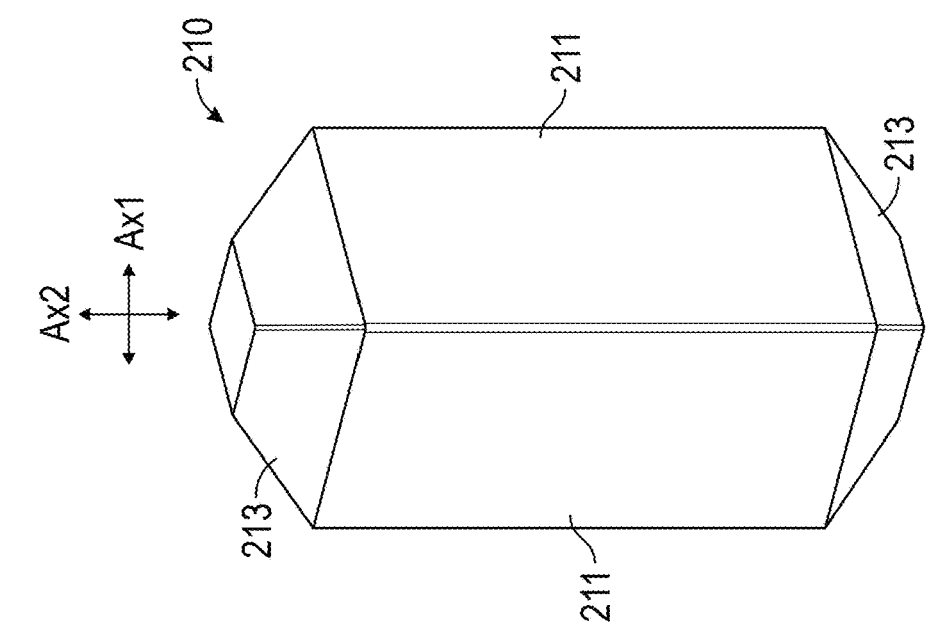
FIG. 19B is a perspective view of the expandable cell of an extendable arm assembly in an intermediate configuration according to a non-limiting example.
Figure 19A:
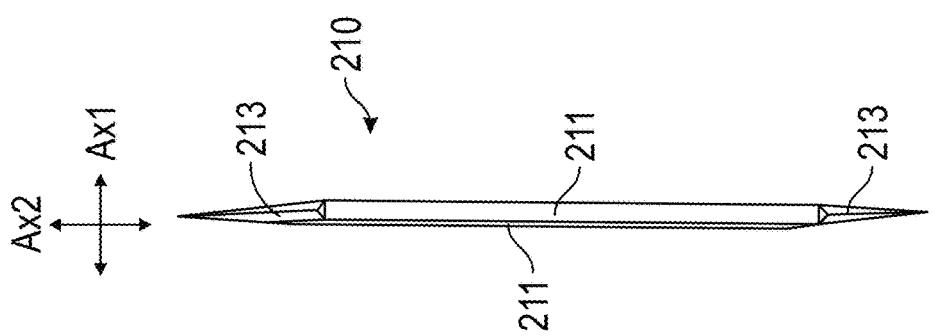
FIG. 19A is a perspective view of an expandable cell of an extendable arm assembly in a stowed configuration according to a non-limiting example.
Figures 24, 25:
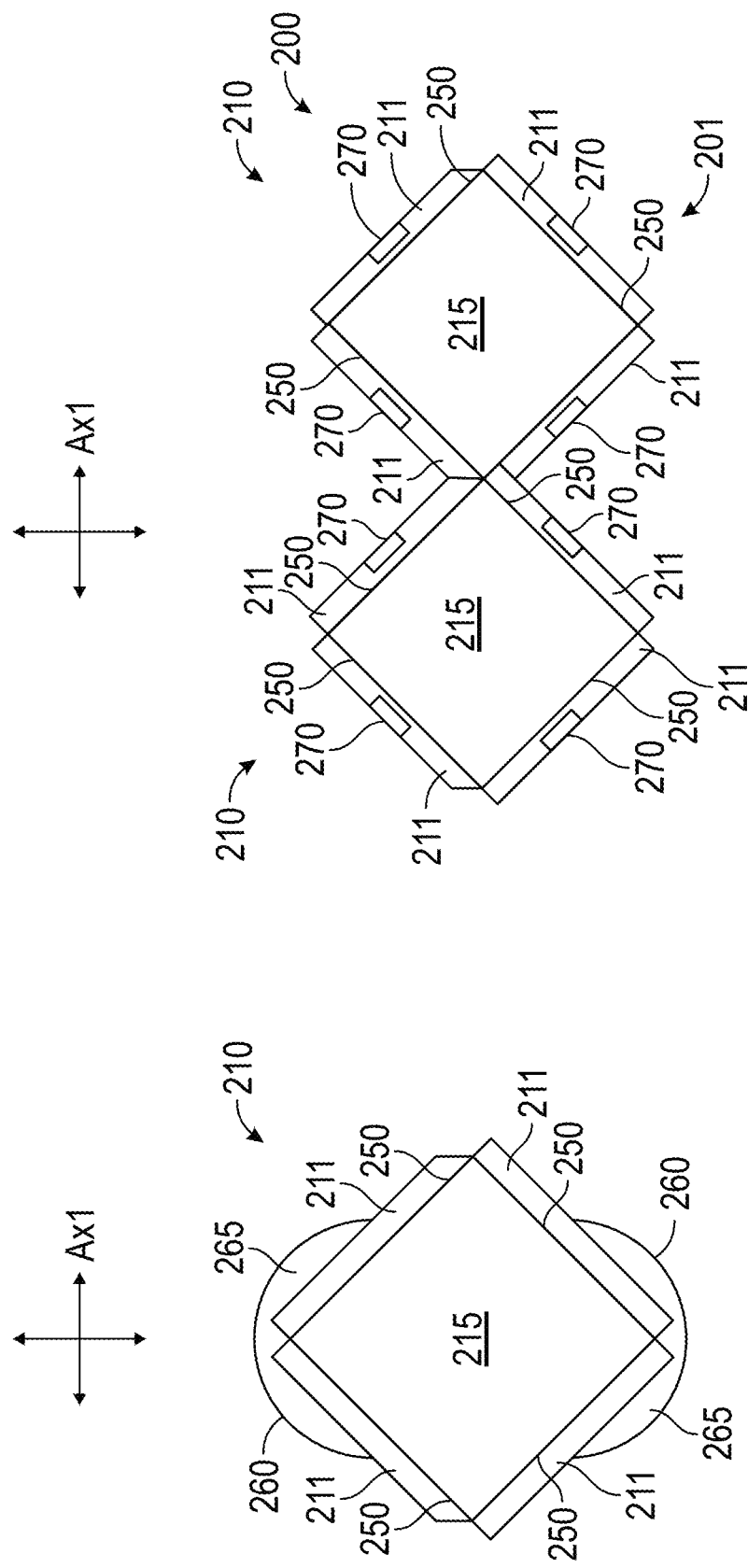
FIG. 24 is a view along a second axis of an expandable cells of an extendable arm assembly according to a non-limiting example.
FIG. 25 is a view along a second axis of two expandable cells of an extendable arm assembly according to a non-limiting example.

FIG. 17A shows the extendable arm structure 201 in a stowed configuration, FIG. 17B shows the extendable arm structure 201 in an intermediate configuration, and FIG. 17C shows the extendable arm structure 201 in an extended configuration. FIGS. 19A and 20A show the expandable cell 210 of the extendable arm structure 201 in a stowed configuration, FIGS. 19B and 20B show the expandable cell 210 of the extendable arm structure 201 in an intermediate configuration, and FIGS. 19C and 20C show the expandable cell 210 of the extendable arm structure 201 in an extended configuration. From the stowed configuration shown in FIG. 17A, the cell chamber 215 within each of the expandable cells 210 may be inflated so as to expand such that the extendable arm structure 201 is in the intermediate configuration shown in FIG. 17B. Although referred to as an intermediate configuration, in a non-limiting example, the intermediate configuration shown in FIG. 17B may be employed as an extended configuration. According to one or more embodiments, from the intermediate configuration, the cell chamber 215 within each of the expandable cells 210 may be vented and the side panels 211 may be aligned to the extended configuration shown in FIG. 17C. As shown in FIG. 24, each of the expandable cells 210 may include second bladders 260 disposed on and bridging adjacent side panels 211. The second bladders 260 may define bladder chambers 265 therein. The bladder chambers 265 may be inflated to align the adjacent side panels 211 such that the expandable cells 210 achieve the extended configuration shown in FIGS. 18C and 19C and the extendable arm structure 201 achieves the extended configuration shown in FIG. 17C.

FIG. 18A shows the extendable arm structure 201 with the end caps 213 removed according to a non-limiting example. The extendable arm structure 201 includes a first bladder 250. The first bladder 250 may be formed as a single integral structure, may be formed by joining two sheets of elastic airtight materials at hinge joints 251, or may be formed by other processes. The side panels 211 are disposed on an outer surface of the first bladder 250. The hinge joints 251 may be formed at an intersection of the expandable cells 210. The hinge joints 251 may extend along the second axis Ax2. As shown in FIG. 18B, which is a cross-section taken at 18B-18B in FIG. 18A, a gap may be formed between the hinge joints 251 aligned along the second axis Ax2, and the gap may form a flowpath 253 through which an inner passage 255 extends. The inner passage 255 may fluidly connect the cell chambers 215 that are adjacent to each other. All of the cell chambers 215 of the extendable arm structure 201 may be fluidly connected via the inner passages 255. Although not shown, the first bladder 250 may extend and covers both ends of the expandable cells 210 along the second axis Ax2, including the end caps 213. According to a non-limiting example, the first bladder 250 may form the end caps 213.

Figures 21A, 21B:
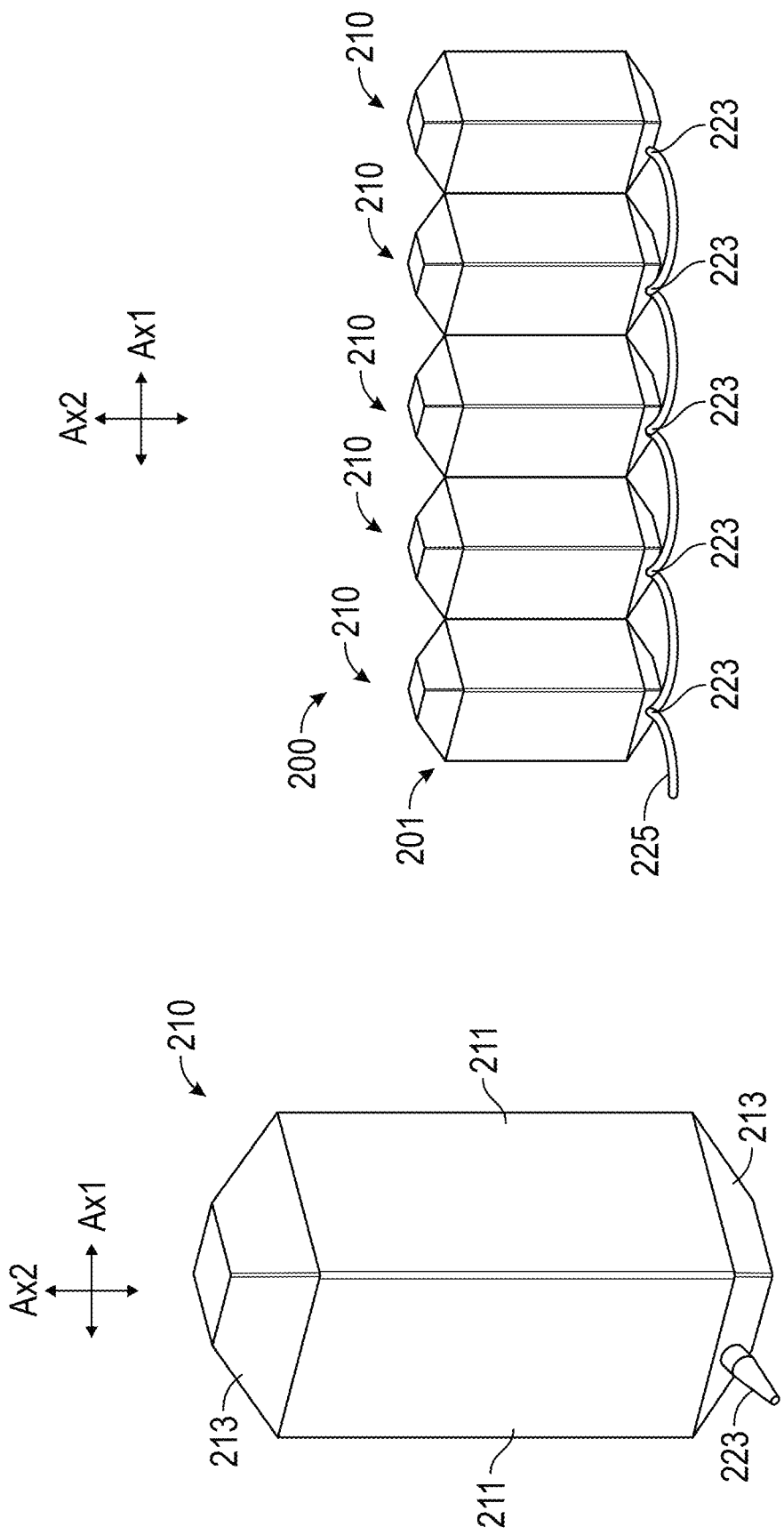
FIG. 21A is a perspective view of an the of an extendable arm assembly according to a non-limiting example.
FIG. 21B is a perspective view of an extendable arm assembly according to a non-limiting example.

As shown in FIG. 21A, the expandable cell 210 may include a fluid inlet 223 for inflating, venting, and vacuuming fluid to/from the cell chamber 215 within the expandable cell 210. The fluid inlet 223 may be disposed on one of the end caps 213 as shown in FIG. 21A. The fluid inlet 223 may be a two-way valve. The fluid inlet 223 being positioned at the end cap 213 may allow for simpler arrayed interconnections between the expandable cells 210. Alternatively, the fluid inlet 223 may be disposed on one of the side panels 211. The fluid inlet 223 may be disposed on only one of the expandable cells 210 of the extendable arm structure 201 and fluid may pass to and from the remaining expandable cells 210 via the inner flowpaths 255. Alternatively, as shown in FIG. 21B, each of the expandable cells 210 may include fluid inlets 223 connected by a fluid line 225 to inflate, vent, and vacuum fluid to/from the cell chambers 215, in which case the flowpath housing 253 and the inner flowpaths 255 may be omitted.

According to one or more embodiments, as shown in FIGS. 22A-22C, the extendable arm assembly 200 may include a first extendable arm structure 201a attached to a second extendable arm structure 201b. Each of the first and second extendable arm structures 201a, 201b may correspond to the extendable arm structure 201 described above. The second bladders 260 may be omitted on sides of the first and second extendable arm structures 201a, 201b attached to each other. The first and second extendable arm structures 201a, 201b attached to each other by attaching the side panels 211 of the first and second extendable arm structures 201a, 201b to each other (e.g., via adhesives). According to a non-limiting example, a number of expandable cells 210b of the second extendable arm structure 201b may be fewer than expandable cells 210a of the first extendable arm structure 201a.

According to one or more embodiments, as shown in FIGS. 22A-22D, the extendable arm assembly 200 may include a first extendable arm structure 201a, a second extendable arm structure 201b, and a third extendable arm structure 201c. The second extendable arm structure 201b and the third extendable arm structure 201c may be attached to opposite sides of the first extendable arm structure 201a. The second bladders 260 may be omitted on sides of the first, second, and third extendable arm structures 201a, 201b, 201c attached to each other. According to a non-limiting example, a number of expandable cells 210b, 210c of the second and third extendable arm structures 201b, 201c may be fewer than expandable cells 210a of the first extendable arm structure 201a.

FIGS. 22A and 23A show the extendable arm assembly 200 in a stowed configuration. The stowed configuration may be achieved by vacuuming the cell chambers 215a, 215b, 215c as described above with respect to FIGS. 17A, 19A, and 20A. FIGS. 22B and 23B show intermediate configurations of the extendable arm assembly 200 between the extended and stowed configurations. The intermediate configuration of the extendable arm assembly 200 may be achieved by inflating the cell chambers 215a, 215b, 215c as described above with respect to FIGS. 17B, 19B, and 20B. FIGS. 22C and 23C show the extendable arm assembly 200 in an extended configuration. The extended configuration of the extendable arm assembly 200 may be achieved by inflating the bladder chambers 265 of the second bladders 260 and venting or vacuuming the cell chambers 215a, 215b, 215c as described above with respect to FIGS. 17C, 19C, 20C, and 24. The extendable arm assembly 200 may be in the stowed configuration when not in use and may be actuated to the extended configuration during use. From the extended configuration, the extendable arm assembly 200 may be returned to the intermediate configuration by venting or vacuuming the bladder chambers 265 and inflating the cell chambers 215a, 215b, 215c. From the intermediate configuration, the extendable arm assembly 200 may be returned to the stowed configuration by vacuuming the cell chambers 215a, 215b, 215c. According to a non-limiting example, the extended configuration may be omitted such that the intermediate configuration shown in FIGS. 22B and 23B may be used as the extended configuration.

Figure 32:
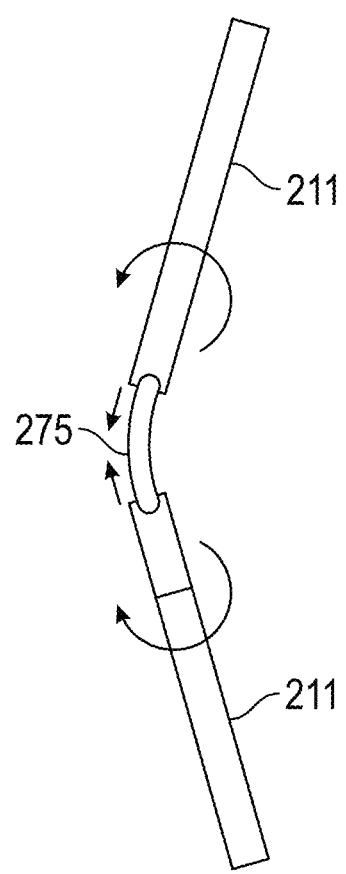
FIG. 32 is an explanatory view of side panels according to a non-limiting example.

As shown in FIG. 25, the expandable cells 210 of the extendable arm structure 201 may include magnets 270 disposed on the side panels 211. When actuating the extendable arm structure 201 from the intermediate configuration shown in FIG. 25 to the stowed configuration, as the cell chamber 215 may have vacuum applied, and the magnets 270 may move towards each other within the magnetic fields thereof, and the magnets 270 may aid in moving the extendable arm structure 201 to the stowed configuration and may further maintain the extendable arm structure 201 within the stowed configuration. The magnets 270 may allow the extendable arm assembly 200 to maintain the extendable arm structure 201 within the stowed configuration without providing a continuous vacuum thereto. As shown in FIG. 32, a flexure hinge 275 may be added between the side panels 211 to bias the side panels 211 towards the stowed configuration or towards the extended configuration. For example, the flexure hinge 275 may be an elastomeric material or a super elastic material (e.g., NiTi shape memory alloys).

While the expandable cells 210 in the extendable arm structure 201 shown and described above are attached at edges of the side panels 211, the present disclosure is not limited thereto. For example, as shown in FIG. 26, the side panel 211 may have one or more surfaces that are attached to surfaces of other side panels 211. While the expandable cells 210 in the extendable arm structure 201 shown and described above as having dimensions along the second axis Ax2 that correspond to each other, the expandable cells 210 may vary in dimension along the second axis Ax2. For example, as shown in FIG. 27, the extendable arm structure 201 may decrease in dimension along the second axis Ax2 from the support structure 50 at least partially towards a free end 209 of the extendable arm structure 201. The decrease in the dimension along the second axis Ax2 may be continuous as shown in FIG. 26 or may be stepwise (not shown). The extendable arm structure 201 having a largest dimension along the second axis Ax2 where it is mounted on the support structure 50 may reduce or prevent downward deflections.

Figure 28:
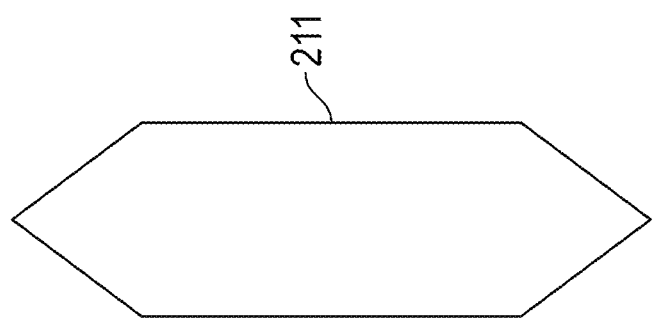
FIG. 28 shows a panel of an extendable arm assembly according to a non-limiting example.

While the side panels 211 are shown and described above as rectangular structures, according to a non-limiting example, the side panels 211 may be diamond shape as shown in FIG. 28. Portions of the side panels 211 may overlap with the end caps 213. That is, when the side panel 211 shown in FIG. 28 is employed in the expandable cells 210 shown in, e.g., FIG. 16, triangular ends of the side panels 211 that is a diamond shape can extend into the end caps 213 to guide folding of the end caps 213 when vacuuming the cell chambers 215 for the stowed configuration or the extended configuration.

Figure 29:
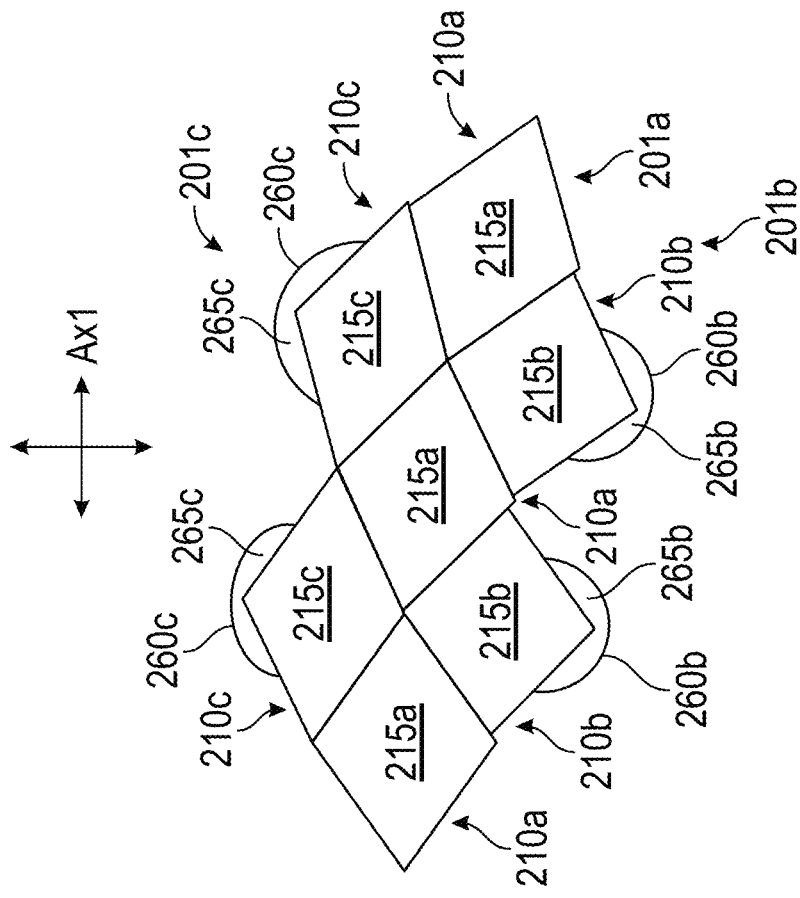
FIG. 29 is an explanatory view of an extendable arm assembly according to a non-limiting example.

As shown in FIG. 29, while actuating the extendable arm assembly 200 between the stowed configuration and the intermediate configuration and between the extended configuration and the intermediate configuration, bladder chambers 265c of second bladders 260c disposed on the expandable cells 210c of the third extendable arm structure 201c may be inflated to have a higher pressure than bladder chambers 215c, causing the expandable cells 210c to extend in along the first axis Ax1. The bladder chambers 265b have a lower pressure than the cell chambers 215b, holding the expandable cells 210b in a square configuration. The extension of expandable cells 210c and the third extendable arm structure 201c on one side of the extendable arm assembly 200 with expandable cells 210b holding a square configuration, causes the extendable arm assembly 200 to move in a curved manner as shown in FIG. 29.

Figure 30:
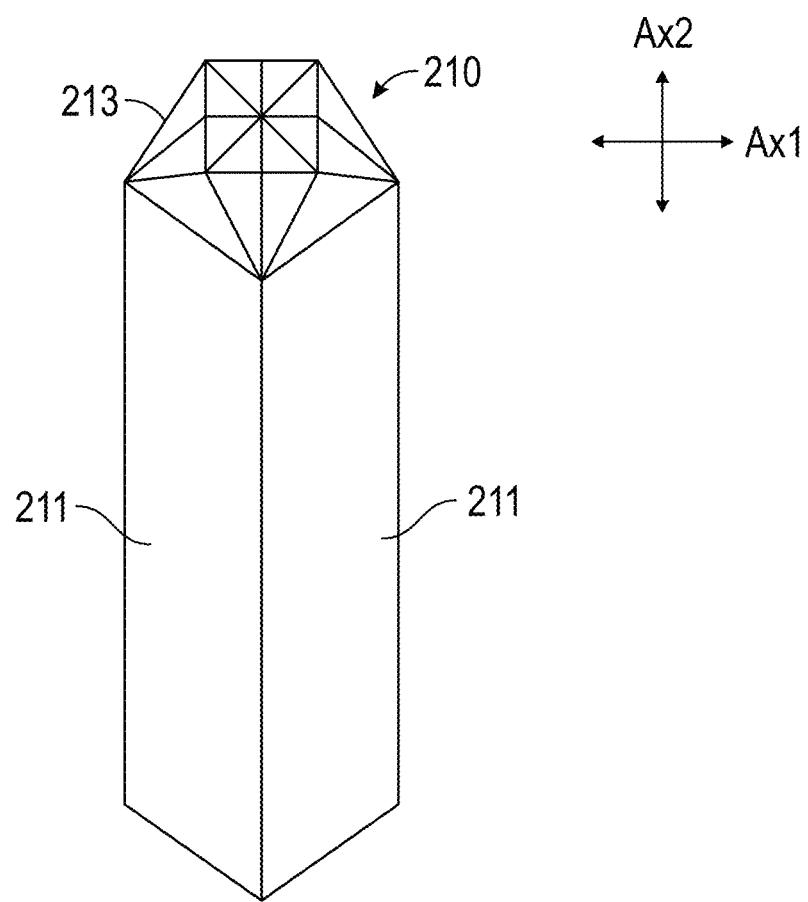
FIG. 30 shows an expandable cell of an extendable arm assembly according to a non-limiting example.

As shown in FIG. 30, the end caps 213 of the expendable cells may have a folded structure to allow the end caps 213 to collapse when in the stowed configuration and the extended configuration.

Figure 31A:
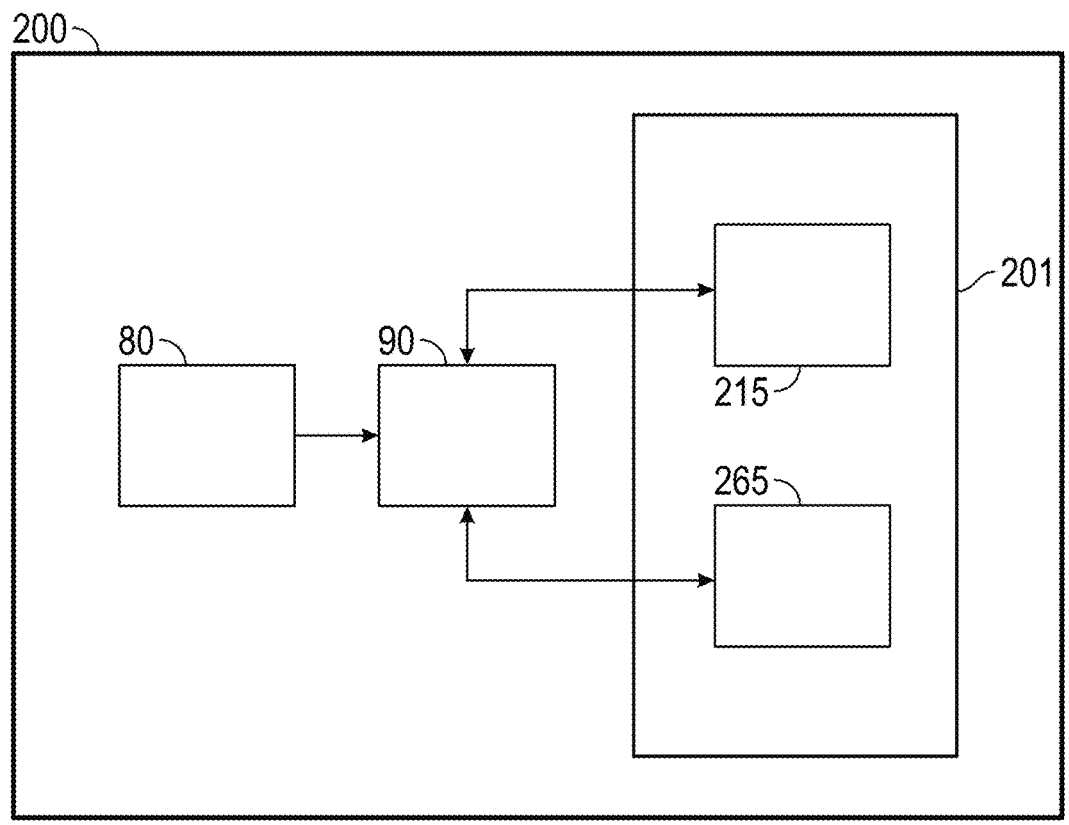
FIG. 31A is a schematic diagram of an extendable arm assembly according to a non-limiting example.

As shown in FIG. 31A, the extendable arm assembly 200 may include a pneumatic transfer device 90 fluidly coupled to the cell chambers 215 and/or the bladder chambers 265. The pneumatic transfer device 90 may transfer fluid (e.g., air) into and out of the cell chambers 215 and/or the bladder chambers 265. The extendable arm assembly 200 may include a controller 80 programmed to control the pneumatic transfer device 90 to inflate and apply vacuum to the cell chambers 215 and/or the bladder chambers 265. The pneumatic transfer device 90 may be a blower, a pump, a fan, or other pneumatic transfer devices known in the art. The pneumatic transfer device 90 may actively inflate the cell chambers 215 and/or the bladder chambers 265, may be turned off such that the cell chambers 215 and/or the bladder chambers 265 are vented, or may actively apply vacuum to the cell chambers 215 and/or the bladder chambers 265. When the cell chambers 215 and/or the bladder chambers 265 are vented, they may equalize with atmospheric pressure.

Figure 31B:
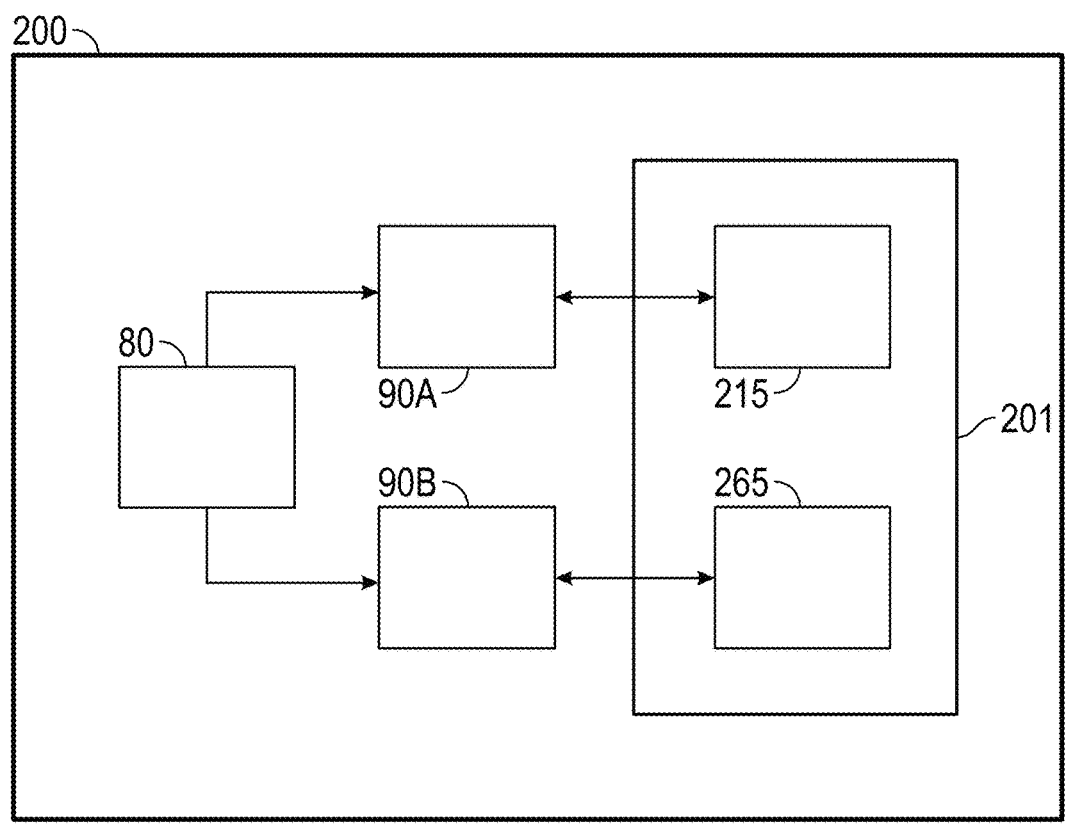
FIG. 31B is a schematic diagram of an extendable arm assembly according to a non-limiting example.

As shown in FIG. 31B, the extendable arm assembly 200 may include a first pneumatic transfer device 90A fluidly coupled to the cell chambers 215 and a second pneumatic transfer device 90B coupled to the bladder chambers 265. The first pneumatic transfer device 90A may transfer fluid (e.g., air) into and out of the cell chambers 215, and the second pneumatic transfer device 90B may transfer fluid (e.g., air) into and out of the bladder chambers 265. The extendable arm assembly 200 may include a controller 80 programmed to control the first and second pneumatic transfer devices 90A, 90B to inflate and apply vacuum to the cell chambers 215 and/or the bladder chambers 265. The first and second pneumatic transfer devices 90A, 90B may be blowers, pumps, fans, or other pneumatic transfer devices known in the art. The first and second pneumatic transfer devices 90A, 90B may actively inflate the cell chambers 215 and/or the bladder chambers 265, may be turned off such that the cell chambers 215 and/or the bladder chambers 265 are vented, or may actively apply vacuum to the cell chambers 215 and/or the bladder chambers 265.

While a pneumatic transfer device 90 is shown in FIGS. 15A and 31A and first and second pneumatic transfer devices 90A, 90B are shown in FIGS. 15B and 31B, the extendable arm assembly 100, 200 may include multiple pneumatic transfer devices 90 and multiple first and second pneumatic transfer devices 90A, 90B.

A extendable arm assembly 100, 200 according to one or more embodiments may provide a safer extendable arm for users, and may provide a more robust extendable arm that may allow for different actuation paths depending on application.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An extendable arm assembly comprising:
an extendable arm structure defining a first axis, a second axis perpendicular to the first axis, and a third axis perpendicular to the first axis and the second axis, the extendable arm structure configured to be actuated between a stowed configuration, an extended configuration in which the extendable arm structure extends along the first axis, and an intermediate configuration between the stowed configuration and the extended configuration, the extendable arm structure comprising a plurality of expandable cells defining cell chambers therein,
wherein the extendable arm assembly is configured to inflate the cell chambers to actuate the extendable arm structure from the stowed configuration to the intermediate configuration.

2. The extendable arm assembly of claim 1, wherein the extendable arm assembly is configured to inflate the cell chambers to return the extendable arm structure from the extended configuration to the intermediate configuration.

3. The extendable arm assembly of claim 1, wherein the extendable arm assembly is configured to apply vacuum to the cell chambers to return the extendable arm structure from the intermediate configuration to the stowed configuration.

4. The extendable arm assembly of claim 1, wherein the plurality of expandable cells comprise a first bladder delimiting the cell chambers.

5. The extendable arm assembly of claim 4, wherein each of the plurality of expandable cells comprises a plurality of side panels disposed on the first bladder.

6. The extendable arm assembly of claim 5, wherein each of the expandable cells comprises end caps positioned at end portions of the side panels along the second axis.

7. The extendable arm assembly of claim 6, wherein the end caps are configured to be folded in the stowed configuration and the extended configuration.

8. The extendable arm assembly of claim 1, further comprising a plurality of second bladders defining bladder chambers therein, at least one of the second bladders being disposed on each of the plurality of expandable cells.

9. The extendable arm assembly of claim 8, wherein the extendable arm assembly is configured to inflate the bladder chambers to actuate the extendable arm structure from the intermediate configuration to the extended configuration.

10. The extendable arm assembly of claim 1, wherein one or more inner flowpaths extends between the plurality of cell chambers to fluidly connect the cell chambers.

11. The extendable arm assembly of claim 1, further comprising magnets disposed on the plurality of expandable cells, the magnets being configured to generate magnetic forces therebetween to return the extendable arm assembly from the intermediate configuration to the stowed configuration.

12. The extendable arm assembly of claim 1, wherein at least one of the plurality of expandable cells includes a fluid inlet.

13. The extendable arm assembly of claim 1, further comprising a pneumatic transfer device fluidly coupled to the cell chambers and configured to apply vacuum to and inflate the cell chambers.

14. The extendable arm assembly of claim 8, further comprising a pneumatic transfer device fluidly coupled to the bladder chambers and configured to inflate the bladder chambers.

15. The extendable arm assembly of claim 5, further comprising a flexure hinge connecting at least two of the side panels.

16. The extendable arm assembly of claim 6, wherein each of the side panels is diamond shaped, and portions of the side panels extend into the end caps.

17. The extendable arm assembly of claim 1,
wherein the extendable arm structure is a first extendable arm structure,
wherein the extendable arm assembly further comprises a second extendable arm structure attached to the first extendable arm structure,
wherein the second extendable arm structure comprises a plurality of expandable cells defining cell chambers therein, and
wherein the extendable arm assembly is configured to inflate the cell chambers of the second extendable arm structure to actuate the second extendable arm structure from the stowed configuration to the intermediate configuration.

18. The extendable arm assembly of claim 17, further comprising:
a third extendable arm structure,
wherein the second extendable arm structure and the third extendable arm structure are attached to opposite sides of the first extendable arm structure along the third axis,
wherein the third extendable arm structure comprises a plurality of expandable cells defining cell chambers therein, and
wherein the extendable arm assembly is configured to inflate the cell chambers of the third extendable arm structure to actuate the second extendable arm structure from the stowed configuration to the intermediate configuration.

19. An extendable arm assembly comprising:
an extendable arm structure defining a first axis, a second axis perpendicular to the first axis, and a third axis perpendicular to the first axis and the second axis, the extendable arm structure configured to be actuated between a stowed configuration, an extended configuration in which the extendable arm structure extends along the first axis, and an intermediate configuration between the stowed configuration and the extended configuration, the extendable arm structure comprising:
a plurality of expandable cells defining cell chambers therein, the expandable cells comprising a first bladder delimiting the cell chambers, and
a plurality of second bladders defining bladder chambers therein, at least one of the plurality second bladders being disposed on each of the plurality of expandable cells;
a first pneumatic transfer device fluidly coupled to the plurality cell chambers and configured to apply vacuum to and inflate the cell chambers; and
a second pneumatic transfer device fluidly coupled to the bladder chambers and configured to apply vacuum to and inflate the bladder chambers,
wherein one or more inner flowpaths extends between the cell chambers to fluidly connect the cell chambers,
wherein at least one of the plurality expandable cells comprises a fluid inlet fluidly coupled to the first pneumatic transfer device,
wherein the first pneumatic transfer device is configured to inflate the cell chambers to actuate the extendable arm structure from the stowed configuration to the intermediate configuration,
wherein the second pneumatic transfer device is configured to inflate the bladder chambers to actuate the extendable arm structure from the intermediate configuration to the extended configuration,
wherein the first pneumatic transfer device is configured to inflate the cell chambers to return the extendable arm structure from the extended configuration to the intermediate configuration,
wherein the first pneumatic transfer device is configured to apply vacuum to the cell chambers to return the extendable arm structure from the intermediate configuration to the stowed configuration, and
wherein each of the expandable cells comprises a plurality of side panels disposed on the first bladder, end caps disposed on end portions of the side panels along the second axis and configured to be folded in the stowed configuration and the extended configuration.

20. A vehicle comprising:
a seat;
an occupant securing device configured to secure an occupant of the vehicle; and
an extendable arm structure on which at least one end of the occupant securing device is attached, the extendable arm structure defining a first axis, a second axis perpendicular to the first axis, and a third axis perpendicular to the first axis and the second axis, the extendable arm structure configured to be actuated between a stowed configuration, an extended configuration in which the extendable arm structure extends along the first axis, and an intermediate configuration between the stowed configuration and the extended configuration, the extendable arm structure comprising a plurality of expandable cells defining cell chambers therein,
wherein the extendable arm assembly is configured to inflate the cell chambers to actuate the extendable arm structure from the stowed configuration to the intermediate configuration.

* * * * *